US012113450B2

(12) United States Patent
Inoki et al.

(10) Patent No.: US 12,113,450 B2
(45) Date of Patent: Oct. 8, 2024

(54) POWER CONVERSION DEVICE

(71) Applicant: KABUSHIKI KAISHA YASKAWA DENKI, Kitakyushu (JP)

(72) Inventors: Keisei Inoki, Fukuoka (JP); Takahiro Saeki, Fukuoka (JP); Toshihiro Hanada, Fukuoka (JP); Kengo Nakahara, Fukuoka (JP); Hideaki Iura, Fukuoka (JP)

( * ) Notice: Subject to any disclaimer, the term of this patent is extended or adjusted under 35 U.S.C. 154(b) by 211 days.

(21) Appl. No.: 17/679,084

(22) Filed: Feb. 24, 2022

(65) Prior Publication Data

US 2022/0278626 A1 Sep. 1, 2022

(30) Foreign Application Priority Data

Feb. 26, 2021 (JP) ................. 2021-030229

(51) Int. Cl.
*H02M 5/458* (2006.01)
*H02P 1/26* (2006.01)
(Continued)

(52) U.S. Cl.
CPC .............. *H02M 5/458* (2013.01); *H02P 1/26* (2013.01); *H02P 21/22* (2016.02); *H02P 27/04* (2013.01); *H02P 29/028* (2013.01)

(58) Field of Classification Search
CPC .......... H02M 5/458; H02P 1/26; H02P 21/22; H02P 27/04; H02P 29/028; H02P 2207/01; H02P 25/16; H02P 21/05; H02P 21/0003

See application file for complete search history.

(56) References Cited

U.S. PATENT DOCUMENTS

| 6,107,774 A | 8/2000 | Yamada et al. |
| 2008/0246425 A1 | 10/2008 | Atarashi |

(Continued)

FOREIGN PATENT DOCUMENTS

| EP | 3624330 | 3/2020 |
| JP | H4-325893 | 11/1992 |

(Continued)

OTHER PUBLICATIONS

Extended Search Report in corresponding European Application No. 22158215.8, dated Jul. 27, 2022.

*Primary Examiner* — Bickey Dhakal
(74) *Attorney, Agent, or Firm* — SOEI PATENT & LAW FIRM

(57) ABSTRACT

The power conversion device may include: power conversion circuitry configured to perform a power conversion for outputting a driving power to an induction motor; and control circuitry. The control circuitry may be configured to: receive a master command phase from a master power conversion device; generate a voltage command having a command phase in a rotating coordinate system based on a torque target value, wherein a rotating magnetic field for driving a rotor of the induction motor is generated to rotate with the rotating coordinate system; calculate a rotation phase of the rotating coordinate system based on a command phase difference between the master command phase and the command phase to reduce the command phase difference; and control the power conversion circuitry to output the driving power to the induction motor, in synchronization with the master power conversion device, based on the rotation phase and the voltage command.

20 Claims, 14 Drawing Sheets

(51) Int. Cl.
*H02P 21/22* (2016.01)
*H02P 27/04* (2016.01)
*H02P 29/028* (2016.01)

(56) References Cited

U.S. PATENT DOCUMENTS

2017/0117834 A1 4/2017 Fujii et al.
2020/0023887 A1* 1/2020 Sasaki .................. B62D 5/0493
2020/0313590 A1* 10/2020 Otake .................. B62D 5/0463
2020/0331517 A1* 10/2020 Toko ................... B62D 5/0493

FOREIGN PATENT DOCUMENTS

| JP | H7-298685 | | 11/1995 |
| JP | H11-262293 | | 9/1999 |
| JP | 2007312533 A | * | 11/2007 |
| JP | 4997825 | | 8/2012 |
| JP | 2017-079580 | | 4/2017 |

* cited by examiner

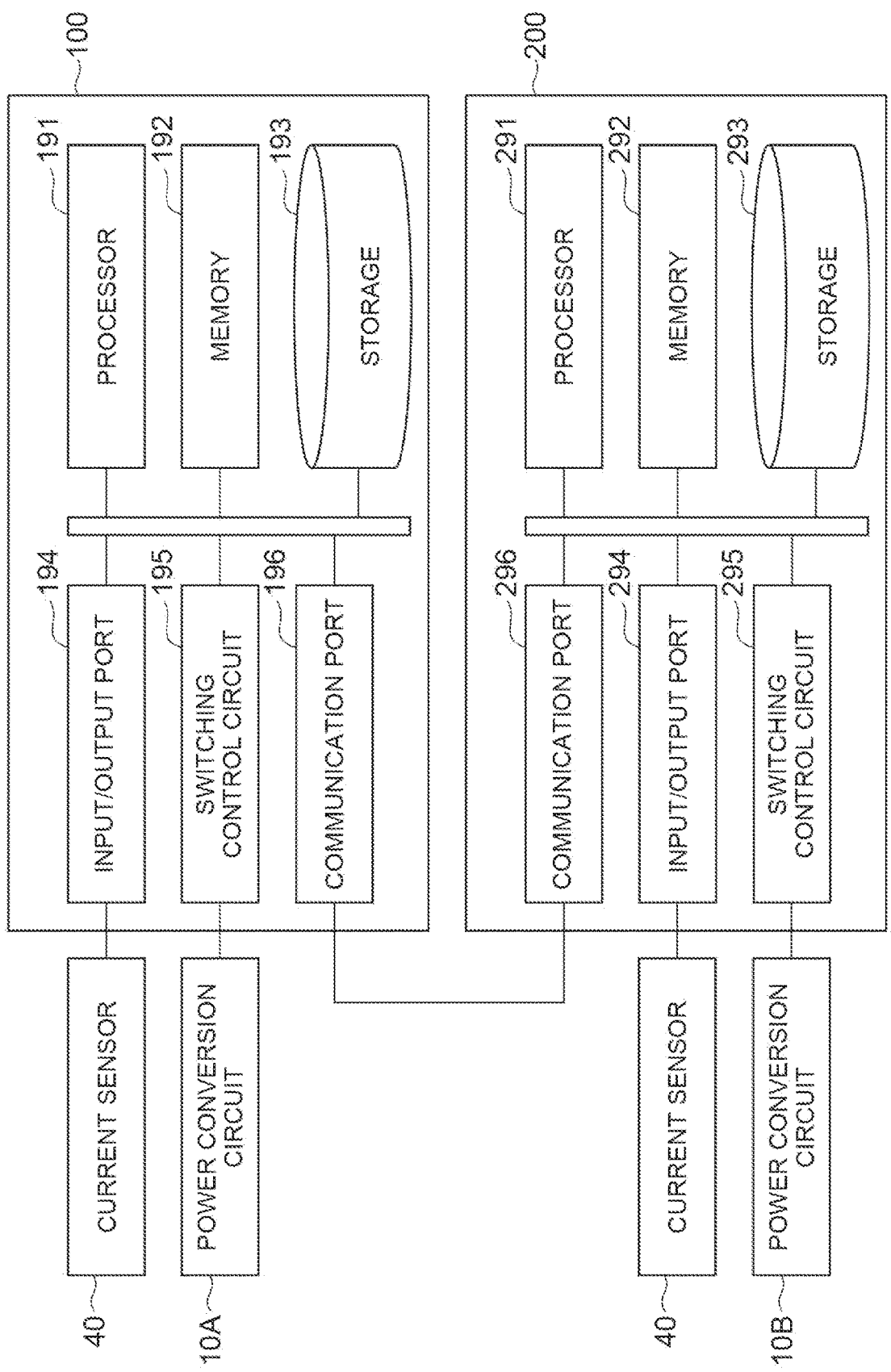

POWER CONVERSION DEVICE

CROSS-REFERENCE TO RELATED APPLICATIONS

This application claims the benefit of priority to Japanese Patent Application No. 2021-030229, filed on Feb. 26, 2021, the entire contents of which are incorporated herein by reference.

BACKGROUND

Field

Japanese Patent Application Publication No. 2017-79580 discloses a system including a motor having a first winding group and a second winding group, a first inverter corresponding to the first winding group, and a second inverter corresponding to the second winding group.

SUMMARY

Disclosed herein is an example power conversion device. The power conversion device may include: power conversion circuitry configured to perform a power conversion for outputting a driving power to an induction motor; and control circuitry. The control circuitry may be configured to: receive a master command phase from a master power conversion device; generate a voltage command having a command phase in a rotating coordinate system based on a torque target value, wherein a rotating magnetic field for driving a rotor of the induction motor is generated to rotate with the rotating coordinate system; calculate a rotation phase of the rotating coordinate system based on a command phase difference between the master command phase and the command phase to reduce the command phase difference; and control the power conversion circuitry to output the driving power to the induction motor, in synchronization with the master power conversion device, based on the rotation phase and the voltage command.

Additionally, an example power conversion method is disclosed herein. The power conversion method may include: generating a first voltage command having a first command phase in a first rotating coordinate system based on a first torque target value; calculating a first rotation phase of the first rotating coordinate system based on a first torque target value and a rotor speed of an induction motor; outputting a first driving power to the induction motor based on the first rotation phase and the first voltage command; generating a second voltage command having a command phase in a second rotating coordinate system based on a second torque target value, wherein a rotating magnetic field for driving a rotor of the induction motor is generated to rotate with the second rotating coordinate system; calculating a second rotation phase of the second rotating coordinate system based on a command phase difference between the first command phase and the command phase to reduce the command phase difference; and outputting a second driving power to the induction motor, in synchronization with the first driving power, based on the second rotation phase and the second voltage command.

Additionally, an example non-transitory memory device having instructions stored thereon that, in response to execution by a processing device, cause the processing device to perform operations. The operations may include: receiving a master command phase from a master power conversion device; generating a voltage command having a command phase in a rotating coordinate system based on a torque target value, wherein a rotating magnetic field for driving a rotor of an induction motor is generated to rotate with the rotating coordinate system; calculating a rotation phase of the rotating coordinate system based on a command phase difference between the master command phase and the command phase to reduce the command phase difference; and controlling a power conversion circuitry to output a driving power to the induction motor, in synchronization with the master power conversion device, based on the rotation phase and the voltage command.

BRIEF DESCRIPTION OF THE DRAWINGS

FIG. 9 is a diagram illustrating an example hardware configuration of the master control circuit and the slave control circuit.

DETAILED DESCRIPTION

In the following description, with reference to the drawings, the same reference numbers are assigned to the same components or to similar components having the same function, and overlapping description is omitted.

Drive System

Figure 1:
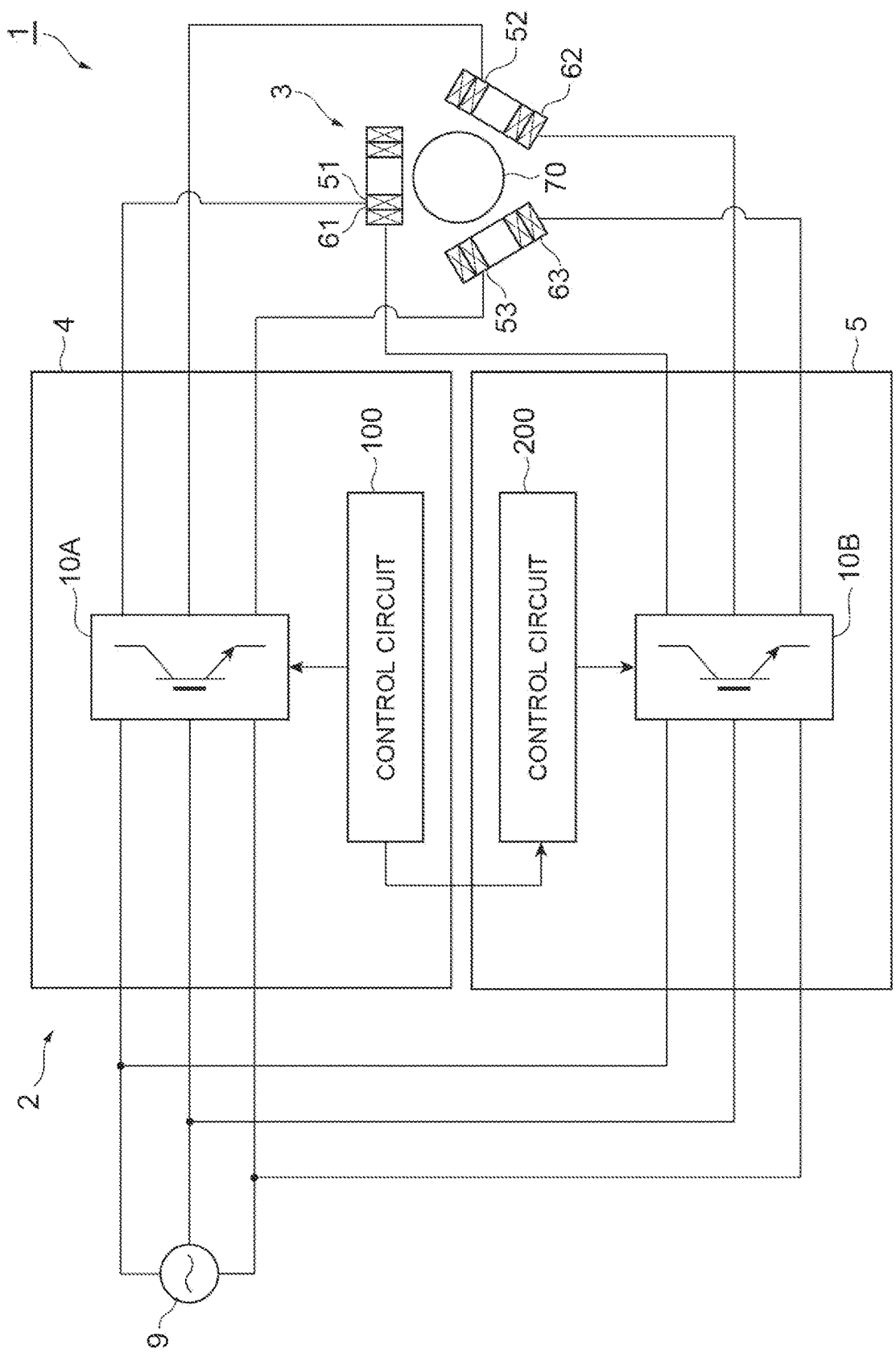
FIG. 1 is a diagram illustrating an example overall configuration of a drive system.

A drive system 1 illustrated in FIG. 1 is a system that causes a driven object to perform a desired motion with an induction motor. The drive system 1 includes an electric motor 3 and a control system 2.

The electric motor 3 is an induction motor, and includes a first group of primary coils 51, 52, 53 that generate a first rotating magnetic field in response to supply of AC power, a second group of primary coils 61, 62, 63 that generate a second rotating magnetic field in response to supply of AC power, and a rotor 70. The first group of the primary coils 51, 52, 53 and the second group of the primary coils 61, 62, 63 are isolated from each other. Both of the first rotating magnetic field and the second rotating magnetic field generate torque in the rotor 70.

The control system 2 includes two power conversion devices 4, 5 that supply AC power to the first group of the primary coils 51, 52, 53 and the second group of the primary coils 61, 62, 63, respectively.

The power conversion device 4 includes a power conversion circuit 10A (master power conversion circuitry) and a master control circuit 100 (master control circuitry). The power conversion circuit 10A converts a primary side power supplied from a power supply 9 into a secondary side power and supplies the secondary side power to the primary coils 51, 52, 53. The primary side power may be alternate current (AC) power or may be direct current (DC) power. The secondary side power is AC power. FIG. 1 illustrates a case where each of the primary side power and the secondary side power is three-phase AC power.

The master control circuit 100 is configured to: calculate a phase (a master rotation phase) according to a rotation angle of a rotating coordinate system (a master rotating coordinate system) based on a torque target value (a master torque target value) and a rotational speed (a rotor speed) of the motor 3 (a rotational speed of the rotor 70); generate a voltage command (a master voltage command) in the master rotating coordinate system based on the master torque target value; and control secondary side voltage of the power conversion circuit 10A to correspond to the master voltage command based on the phase of the master rotating coordinate system and the voltage command. Accordingly, a master driving power is output to the electric motor 3, and a first rotating magnetic field according to the master torque target value is generated. The master voltage command has a master command phase in the master rotating coordinate system.

The power conversion device 5 includes a power conversion circuit 10B (power conversion circuitry) and a slave control circuit 200 (control circuitry). The power conversion circuit 10B converts a primary side power supplied from the power supply 9 into a secondary side power and supplies the secondary side power to the primary coils 61, 62, 63. If the slave control circuit 200 controls the power conversion circuit 10B in the same manner as the master control circuit 100 controls the power conversion circuit 10A, a second rotating magnetic field according to a torque target value (slave torque target value) is generated.

Accordingly, since the first rotating magnetic field generated by the primary coils 51, 52, 53 and the second rotating magnetic field generated by the primary coils 61, 62, 63 act on the rotor 70, respectively, it is possible to prevent an increase in the size of each of the power conversion devices 4, 5 with respect to the magnitude of the torque to be generated from the electric motor 3.

Here, since the primary coils 51, 52, 53 and the primary coils 61, 62, 63 are disposed in the same electric motor 3, the first rotating magnetic field and the second rotating magnetic field may interfere with each other, which may adversely affect the operation of the rotor 70.

On the other hand, the power conversion device 5 is configured to: calculate a phase (rotation phase) corresponding to a rotation angle of a rotating coordinate system (a slave rotating coordinate system) based on the slave torque target value and the rotational speed of the electric motor 3; correct the phase of the slave rotating coordinate system to follow the phase of the master rotating coordinate system; generate a voltage command in the slave rotating coordinate system (a slave voltage command) based on the slave torque target value; and control the secondary side voltage of the power conversion circuit 10B to correspond to the slave voltage command based on the corrected phase of the slave rotating coordinate system and the slave voltage command. Accordingly, a slave driving power is output to the electric motor 3. The slave voltage command has a slave command phase in the slave rotating coordinate system.

Thus, the second rotating magnetic field can be synchronized with the first rotating magnetic field. However, as the rotational speed of the electric motor 3 increases, the changing speed of the phase of the master rotating coordinate system increases, and thus it is difficult to receive information of the phase of the master rotating coordinate system with high accuracy.

On the other hand, the slave control circuit 200 is configured to correct the phase of the rotating coordinate system based on a phase (the master command phase) of the master voltage command in the master rotating coordinate system (hereinafter referred to as a "master voltage phase"). The master voltage phase is not information indicating the phase itself of the master rotating coordinate system, but a deviation of the phase of the slave rotating coordinate system with respect to the phase of the master rotating coordinate system may be grasped based on the master voltage phase. Therefore, by correcting the calculation result of the phase of the slave rotating coordinate system based on the voltage phase in the master rotating coordinate system, the slave rotating coordinate system can easily follow the master rotating coordinate system. Even if the rotational speed of the induction motor increases, the change in the master voltage phase does not increase. Therefore, by correcting the phase of the slave rotating coordinate system based on the master voltage phase, the second rotating magnetic field can be synchronized with the first rotating magnetic field with reliability.

Hereinafter, configurations of the power conversion device 4 (a master device) and the power conversion device 5 (a slave device) will be described in detail. In the description of the master device, the master torque target value is simply referred to as a "torque target value", the master rotating coordinate system is simply referred to as a "rotating coordinate system", and the master voltage command is simply referred to as a "voltage command". In the description of the slave device, the slave torque target value is simply referred to as a "torque target value", the slave rotating coordinate system is simply referred to as a "rotating coordinate system", and the slave voltage command is simply referred to as a "voltage command".

Master Device

The power conversion circuit 10A may be any circuit as long as it converts the primary side power into the secondary side power as described above. For example, if the primary side power is DC power, the power conversion circuit 10A may be an inverter circuit. The inverter circuit converts DC power into AC power by turning on and off a plurality of switching elements.

If the primary side power is AC power, the power conversion circuit 10A may be a circuit in which a rectifier circuit or a PWM converter circuit is combined with an inverter circuit. The rectifier circuit converts AC power into DC power by a diode bridge. The PWM converter circuit converts AC power into DC power by turning on and off a plurality of switching elements.

The power conversion circuit 10A may be a matrix converter circuit that performs power conversion from primary side power to secondary side power and power conversion from secondary side power to primary side power.

Figure 2:
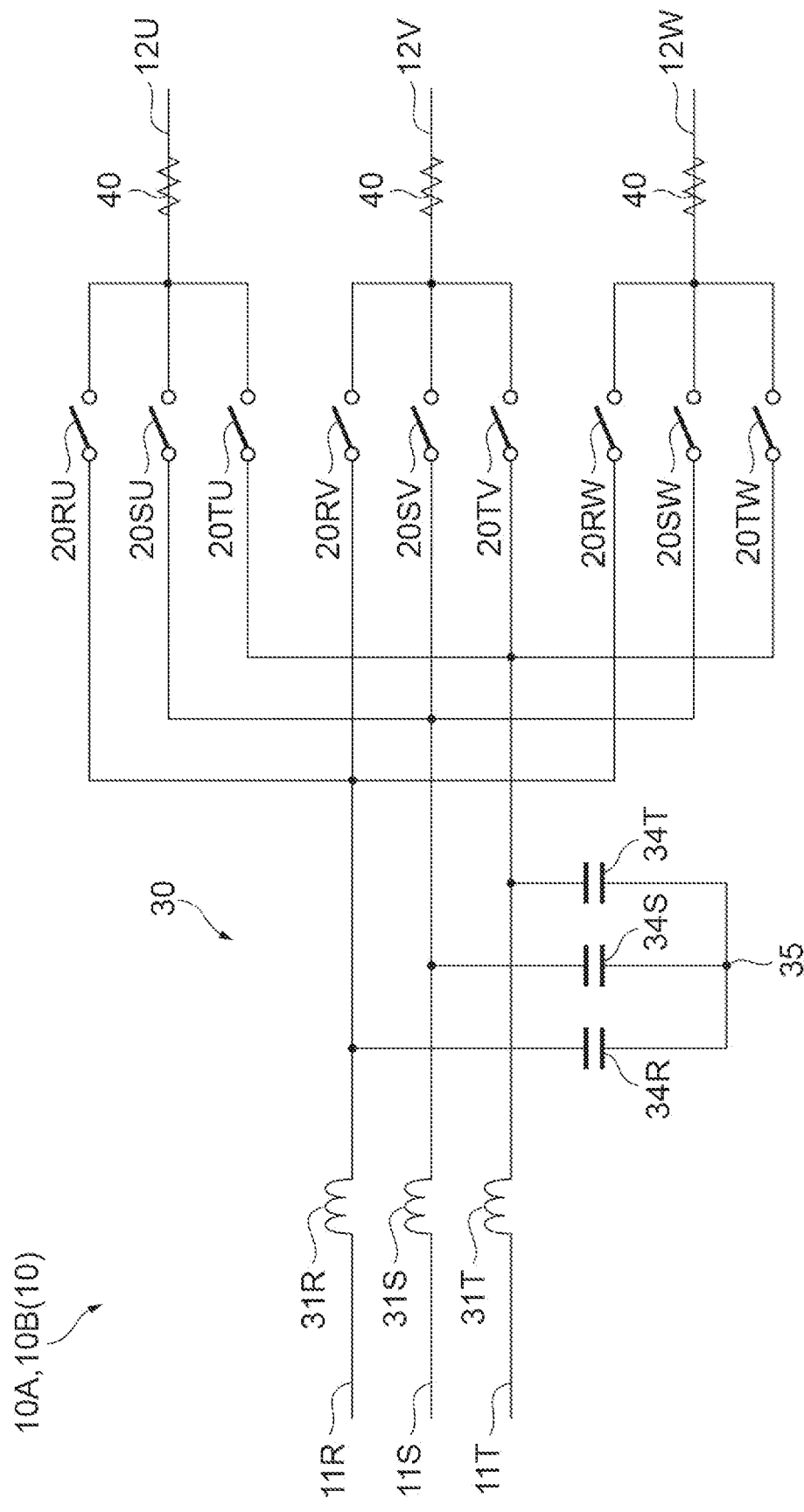
FIG. 2 is a diagram illustrating an example configuration of a power conversion circuit.

FIG. 2 is a diagram illustrating a configuration in a case where the power conversion circuit 10A is a matrix converter circuit.

The power conversion circuit 10A illustrated in FIG. 2 includes power lines 11R, 11S, 11T on the primary side, power lines 12U, 12V, 12W on the secondary side, and nine sets of bidirectional switches 20RU, 20SU, 20TU, 20RV, 20SV, 20TV, 20RW, 20SW, 20TW.

The power line 11R is an R-phase power transmission line on the primary side. The power line 11S is an S-phase power transmission line on the primary side. The power line 11T is a T-phase power transmission line on the primary side. The power line 12U is a U-phase power transmission line on the secondary side. The power line 12V is a V-phase power transmission line on the secondary side. The power line 12W is a W-phase power transmission line on the secondary side.

Each of the bidirectional switches 20RU, 20SU, 20TU, 20RV, 20SV, 20TV, 20RW, 20SW, 20TW switches between three states: a state in which current flows from the primary side to the secondary side, a state in which current flows from the secondary side to the primary side, and a state in which current does not flow. The bidirectional switch 20RU is interposed between the power line 11R and the power line 12U, and switches between a first ON state in which current flows from the power line 11R to the power line 12U, a second ON state in which current flows from the power line 12U to the power line 11R, and a bi-directional OFF state in which no current flows. The bidirectional switch 20SU is interposed between the power line 11S and the power line 12U, and switches between a first ON state in which current flows from the power line 11S to the power line 12U, a second ON state in which current flows from the power line 12U to the power line 11S, and a bi-directional OFF state in which no current flows. The bidirectional switch 20TU is interposed between the power line 11T and the power line 12U, and switches between a first ON state in which current flows from the power line 11T to the power line 12U, a second ON state in which current flows from the power line 12U to the power line 11T, and a bi-directional OFF state in which no current flows.

The bidirectional switch 20RV is interposed between the power line 11R and the power line 12V, and switches between a first ON state in which current flows from the power line 11R to the power line 12V, a second ON state in which current flows from the power line 12V to the power line 11R, and a bi-directional OFF state in which no current flows. The bidirectional switch 20SV is interposed between the power line 11S and the power line 12V, and switches between a first ON state in which current flows from the power line 11S to the power line 12V, a second ON state in which current flows from the power line 12V to the power line 11S, and a bi-directional OFF state in which no current flows. The bidirectional switch 20TV is interposed between the power line 11T and the power line 12V, and switches between a first ON state in which current flows from the power line 11T to the power line 12V, a second ON state in which current flows from the power line 12V to the power line 11T, and a bi-directional OFF state in which no current flows.

The bidirectional switch 20RW is interposed between the power line 11R and the power line 12W, and switches between a first ON state in which current flows from the power line 11R to the power line 12W, a second ON state in which current flows from the power line 12W to the power line 11R, and a bi-directional OFF state in which no current flows. The bidirectional switch 20SW is interposed between the power line 11S and the power line 12W, and switches between a first ON state in which current flows from the power line 11S to the power line 12W, a second ON state in which current flows from the power line 12W to the power line 11S, and a bi-directional OFF state in which no current flows. A bidirectional switch 20TW is interposed between the power line 11T and the power line 12W, and switches between a first ON state in which current flows from the power line 11T to the power line 12W, a second ON state in which current flows from the power line 12W to the power line 11T, and a bi-directional OFF state in which no current flows.

Figure 3:
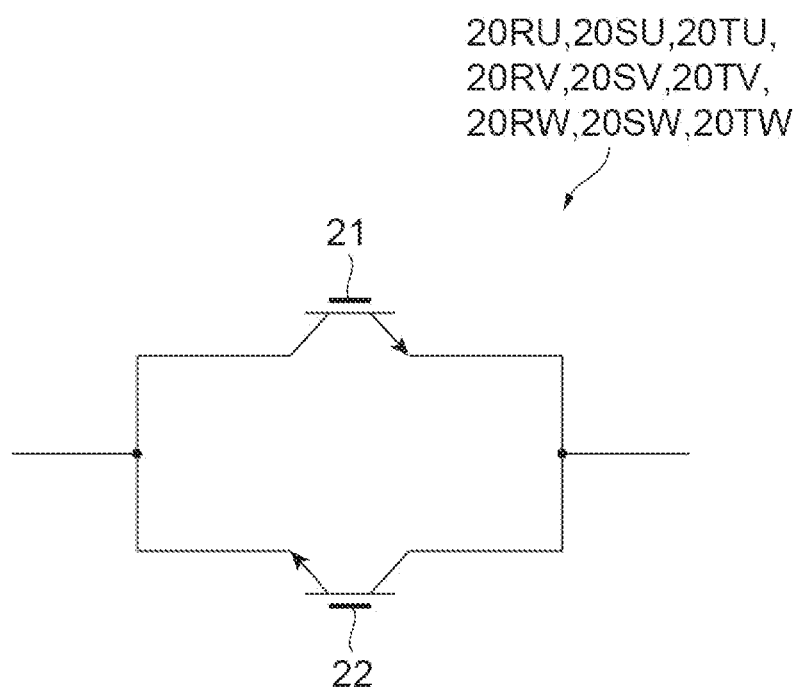
FIG. 3 is a diagram illustrating an example configuration of a bidirectional switch.

As illustrated in FIG. 3, the bidirectional switches 20RU, 20SU, 20TU, 20RV, 20SV, 20TV, 20RW, 20SW, 20TW include two switches 21, 22. The switch 21 passes a current from the primary side to the secondary side without passing a current from the secondary side to the primary side in an ON state. The switch 22 passes current from the secondary side to the primary side without passing current from the primary side to the secondary side in an ON state. Further, the switches 21, 22 are switches having a reverse blocking capability capable of maintaining the OFF state with respect to an application of a voltage in a direction opposite to the flow direction in the ON state.

The bidirectional switches 20RU, 20SU, 20TU, 20RV, 20SV, 20TV, 20RW, 20SW, 20TW are brought into the first ON state by bringing the switch 21 into the ON state and bringing the switch 22 into the OFF state, brought into the second ON state by bringing the switch 21 into the OFF state and bringing the switch 22 into the ON state, and brought into the bi-directional OFF state by bringing the switches 21, 22 into the OFF state.

In the FIG. 3, the bidirectional switches 20RU, 20SU, 20TU, 20RV, 20SV, 20TV, 20RW, 20SW, 20TW may include a diode connected in series to each of the switches 21, 22 having no reverse blocking capability. In this case, a connection point between the switch 21 and the diode and a connection point between the switch 22 and the diode may be connected.

Returning to the FIG. 2, a filter 30 reduces the harmonic content of the voltage or current at the primary side power. For example, the filter 30 includes inductors 31R, 31S, 31T and capacitors 34R, 34S, 34T. The inductors 31R, 31S, 31T are located in the power lines 11R, 11S, 11T, respectively.

The capacitor 34R is located between the power line 11R and a neutral point 35 on the secondary side of the inductor 31R (between the inductor 31R and the bidirectional switches 20RU, 20RV, 20RW). The capacitor 34S is located between the power line 11S and the neutral point 35 on the secondary side of the inductor 31S (between the inductor 31S and the bidirectional switch 20SU, 20SV, 20SW). The capacitor 34T is located between the power line 11T and the neutral point 35 on the secondary side of the inductor 31T (between the inductor 31T and the bidirectional switch 20TU, 20TV, 20TW).

A current sensor 40 detects an instantaneous value of a current in the secondary side power (a current flowing between a matrix converter circuit 10 and the electric motor 3). For example, the current sensor 40 detects the instantaneous value of the current in the power lines 12U, 12V, 12W. Hereinafter, the current in the secondary side power is referred to as a "secondary side current". The voltage in the secondary side power is referred to as a "secondary side voltage".

The current sensor 40 may be configured to detect secondary side current values of all phases of the power lines 12U, 12V, 12W, or may be configured to detect secondary side current values of any two phases of the power lines 12U, 12V, 12W. Since the sum of the current values of the U phase, the V phase, and the W phase is zero as long as the zero-phase current is not generated, information on the secondary side current values of all phases is obtained even when the secondary side current values of two phases are detected.

Figure 4:
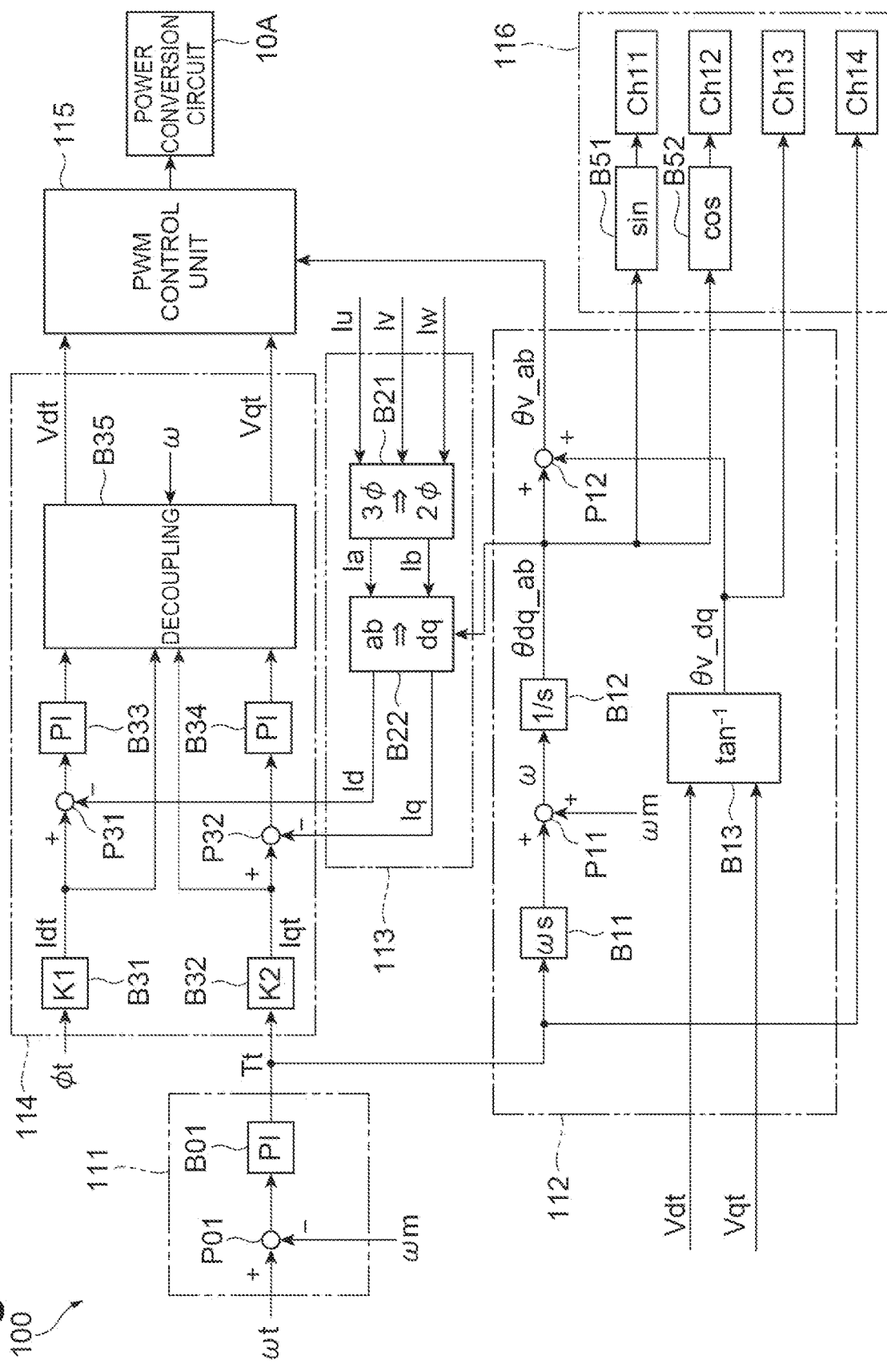
FIG. 4 is a block diagram illustrating an example configuration of a master control circuit.

The master control circuit 100 repeatedly executes the above-described control of the power conversion circuit 10A at a predetermined control cycle. As illustrated in FIG. 4, the master control circuit 100 includes a torque target value calculation unit 111, a phase calculation unit 112, a current information acquisition unit 113, a voltage command generation unit 114, a PWM control unit 115, and a master information output unit 116 as functional configurations.

The torque target value calculation unit 111 is configured to calculate the torque target value based on a speed command value $\omega t$ and a speed feedback value $\omega m$. For example, the torque target value calculation unit 111 calculates a deviation (speed deviation) between the speed command value $\omega t$ and the speed feedback value $\omega m$ as indicated by an addition point P01, and calculates a torque target value Tt by performing proportional operation, proportional-integral operation, or proportional-integral-derivative operation on the speed deviation as indicated by a transfer block B01. The speed feedback value $\omega m$ may be a value detected by a sensor or may be an estimated value calculated without a sensor. The master control circuit 100 may obtain the torque target value from the outside of the power conversion device 4.

The phase calculation unit 112 (a master phase calculation unit) is configured to calculate the phase (a coordinate phase $\theta dq\_ab$) of the rotating coordinate system based on the torque target value Tt and the rotational speed (the speed feedback value $\omega m$ described above) of the electric motor 3. The rotating coordinate system is a coordinate system which rotates in synchronization with a first rotating magnetic field. For example, the rotating coordinate system is a dq coordinate system having a d-axis and a q-axis intersecting a central axis of rotation of the rotor 70. The d-axis and the q-axis are coordinate axes perpendicular to each other. The phase calculation unit 112 may calculate an angular frequency command value $\omega$ based on the torque target value Tt and the speed feedback value $\omega m$, and may integrate the angular frequency command value $\omega$ to calculate the coordinate phase $\theta dq\_ab$. The coordinate phase $\theta dq\_ab$ is the phase of the dq coordinate system with respect to an ab coordinate system that is a fixed coordinate system. The ab coordinate system has an a-axis and a b-axis intersecting the central axis of rotation of the rotor 70. The a-axis and the b-axis are coordinate axes perpendicular to each other.

For example, the phase calculation unit 112 calculates the slip angular speed of the rotating coordinate system with respect to the rotor 70 based on the torque target value Tt as indicated by a transfer block B11, and calculates the angular frequency command value $\omega$ by adding the speed feedback value $\omega m$ to the slip angular speed as indicated by an addition point P11. Further, the phase calculation unit 112 integrates the angular frequency command value $\omega$ to calculate the coordinate phase $\theta dq\_ab$ as indicated by a transfer block B12.

The phase calculation unit 112 may calculate the voltage phase $\theta v\_ab$ in the fixed coordinate system based on a voltage phase $\theta v\_dq$ (the master voltage phase) in the rotating coordinate system and the coordinate phase $\theta dq\_ab$. The voltage phase is a phase of a voltage command vector representing the voltage command by a single vector. For example, the phase calculation unit 112 calculates the voltage phase $\theta v\_dq$ based on a voltage command value Vdt and a voltage command value Vqt calculated in the previous control cycle as indicated by a transfer block B13. The voltage command value Vdt is a d-axis component of the voltage command vector, and the voltage command value Vqt is a q-axis component of the voltage command vector. The phase calculation unit 112 calculates the voltage phase $\theta v\_ab$ by adding the voltage phase $\theta v\_dq$ to the coordinate phase $\theta dq\_ab$ as indicated by an addition point P12.

The current information acquisition unit 113 is configured to calculate current feedback values Id, Iq based on current feedback values Iu, Iv, Iw detected by the current sensor 40 of the power conversion circuit 10A. The current feedback value Iu is a current detection value of the power line 12U. The current feedback value Iv is a current detection value of the power line 12V. The current feedback value Iw is a current detection value of the power line 12W. The current feedback value Id is a d-axis component of a current vector representing the current feedback values Iu, Iv, Iw by a single vector, and a current feedback value Iq is a q-axis component of the current vector.

For example, the current information acquisition unit 113 calculates a current feedback value Ia and a current feedback value Ib by performing three-phase to two-phase transformation on the current feedback values Iu, Iv, Iw as indicated by a transfer block B21. The current feedback value Ia is an a-axis component of the current vector, and the current feedback value Ib is a b-axis component of the current vector. The current information acquisition unit 113 calculates the current feedback values Id, Iq by subjecting current feedback values Ia, Ib to rotational conversion in the coordinate phase $\theta dq\_ab$, as indicated by a transfer block B22.

The voltage command generation unit 114 (master voltage command generation unit) is configured to generate a voltage command in the rotating coordinate system based on the torque target value Tt. For example, the voltage command generation unit 114 multiplies a predetermined a magnetic flux target value $\Phi t$ by a gain K1 to calculate a current target value Idt as indicated by a transfer block B31, and multiplies the torque target value Tt by a gain K2 to calculate a current target value Iqt as indicated by a transfer block B32. The current target value Idt is a d-axis component of a current command vector representing the current command by a single vector, and the current target value Iqt is a q-axis component of the current command vector.

The voltage command generation unit 114 is configured to generate a voltage command so that the current feedback value Id follows the current target value Idt and the current feedback value Iq follows the current target value Iqt. For example, the voltage command generation unit 114 calculates a d-axis current deviation, which is a deviation between the current target value Idt and the current feedback value Id, as indicated by an addition point P31, and calculates the voltage command value Vdt by performing proportional operation, proportional-integral operation, or proportional-integral-derivative operation on the d-axis current deviation, as indicated by a transfer block B33, for example. The voltage command generation unit 114 calculates a q-axis current deviation, which is a deviation between the current target value Iqt and the current feedback value Iq, as indicated by an addition point P32, and calculates the voltage command value Vqt by performing, for example, a proportional operation, a proportional-integral operation, or a proportional-integral-derivative operation on the q-axis current deviation, as indicated by a transfer block B34.

The voltage command generation unit 114 may perform decoupling of the voltage command between the d-axis and the q-axis based on the current target value Idt, Iqt and the angular frequency command value ω as indicated by a transfer block B35. For example, the voltage command generation unit 114 may correct the voltage command value Vdt based on the current target value Iqt, an equivalent leakage inductance l (l=(L1*L2−M2)/L2), and the angular frequency command value ω, and correct the voltage command value Vqt based on a V/f pattern and the angular frequency command value ω, thereby performing decoupling between the d-axis and the q-axis. The inductance L1 is a primary inductance of the electric motor 3. The inductance L2 is a secondary inductance of the electric motor 3. The inductance M is a mutual inductance of the electric motor 3. The correction of the voltage command value Vqt may be performed with the current target value Idt, the inductance L1, and the angular frequency command value ω. In addition, the voltage command generation unit 114 may use the current feedback values Id, Iq instead of the current target value Idt, Iqt when performing the decoupling.

The PWM control unit 115 (a master control unit) is configured to control the secondary side voltage of the power conversion circuit 10A to correspond to the voltage command based on the coordinate phase θdq_ab of the rotating coordinate system and the voltage command in the rotating coordinate system. For example, the PWM control unit 115 calculates a voltage command of each phase (U phase, V phase, and W phase) of the secondary side based on the coordinate phase θdq_ab and voltage command values Vdt, Vqt, and switches on and off the bidirectional switches 20RU, 20SU, 20TU, 20RV, 20SV, 20TV, 20RW, 20SW, 20TW of the power conversion circuit 10A so that the voltage of each phase of the secondary side corresponds to the voltage command.

The master information output unit 116 (a phase information output unit) is configured to output information on the phase of the rotating coordinate system to the slave control circuit 200 of the power conversion device 5 (the slave device). For example, the master information output unit 116 outputs a signal indicating the voltage phase θv_dq in the rotating coordinate system to the slave control circuit 200. As an example, the master information output unit 116 outputs an analog signal indicating the voltage phase θv_dq from an output channel CH13 to the slave control circuit 200.

As described above, the voltage command values Vdt, Vqt are calculated based on the torque target value Tt, the magnetic flux target value Φt, and the current feedback values Id, Iq. In addition, the current feedback values Id, Iq are calculated by performing rotation conversion on the current feedback values Ia, Ib using the coordinate phase θdq_ab. Therefore, it can be said that the voltage command values Vdt, Vqt are calculated based on the coordinate phase θdq_ab. Accordingly, the voltage phase θv_dq, which is the phase of the voltage command values Vdt, Vqt in the rotating coordinate system, changes in accordance with the coordinate phase θdq_ab. Therefore, the voltage phase θv_dq is an example of a value related to the coordinate phase θdq_ab.

The master information output unit 116 may further output a signal indicating the coordinate phase θdq_ab itself to the slave control circuit 200. As a signal indicating the coordinate phase θdq_ab itself, the master information output unit 116 may output a sine value of the coordinate phase θdq_ab and a cosine value of the coordinate phase θdq_ab to the slave control circuit 200. As an example, the master information output unit 116 calculates a sine value of the coordinate phase θdq_ab as indicated by a transfer block B51, and outputs an analog signal indicating the calculation result from an output channel CH11 to the slave control circuit 200. The master information output unit 116 calculates a cosine value of the coordinate phase θdq_ab as indicated by a transfer block B52, and outputs an analog signal indicating the calculation result from an output channel CH12 to the slave control circuit 200.

The master information output unit 116 may further output the torque target value Tt to the slave control circuit 200. For example, the master information output unit 116 outputs an analog signal indicating the torque target value Tt from a output channel CH14 to the slave control circuit 200.

In the example described above, the master information output unit 116 outputs analog signals indicating the coordinate phase θv_dq, the sine value of the coordinate phase θdq_ab, the cosine value of the coordinate phase θdq_ab, and the torque target value Tt to the slave control circuit 200, but the master information output unit 116 may transmit these pieces of information to the slave control circuit 200 by digital communication.

Slave Device

The power conversion circuit 10B may be any circuit as long as it converts the primary side power into the secondary side power as described above. For example, if the primary side power is DC power, the power conversion circuit 10B may be an inverter circuit. If the primary side power is DC power, the power conversion circuit 10B may be a circuit in which a rectifier circuit or a PWM converter circuit is combined with an inverter circuit. The power conversion circuit 10B may be a matrix converter circuit. Since the configuration of the power conversion circuit 10B is the same as that of the power conversion circuit 10A, a more detailed description thereof will be omitted.

Figure 5:
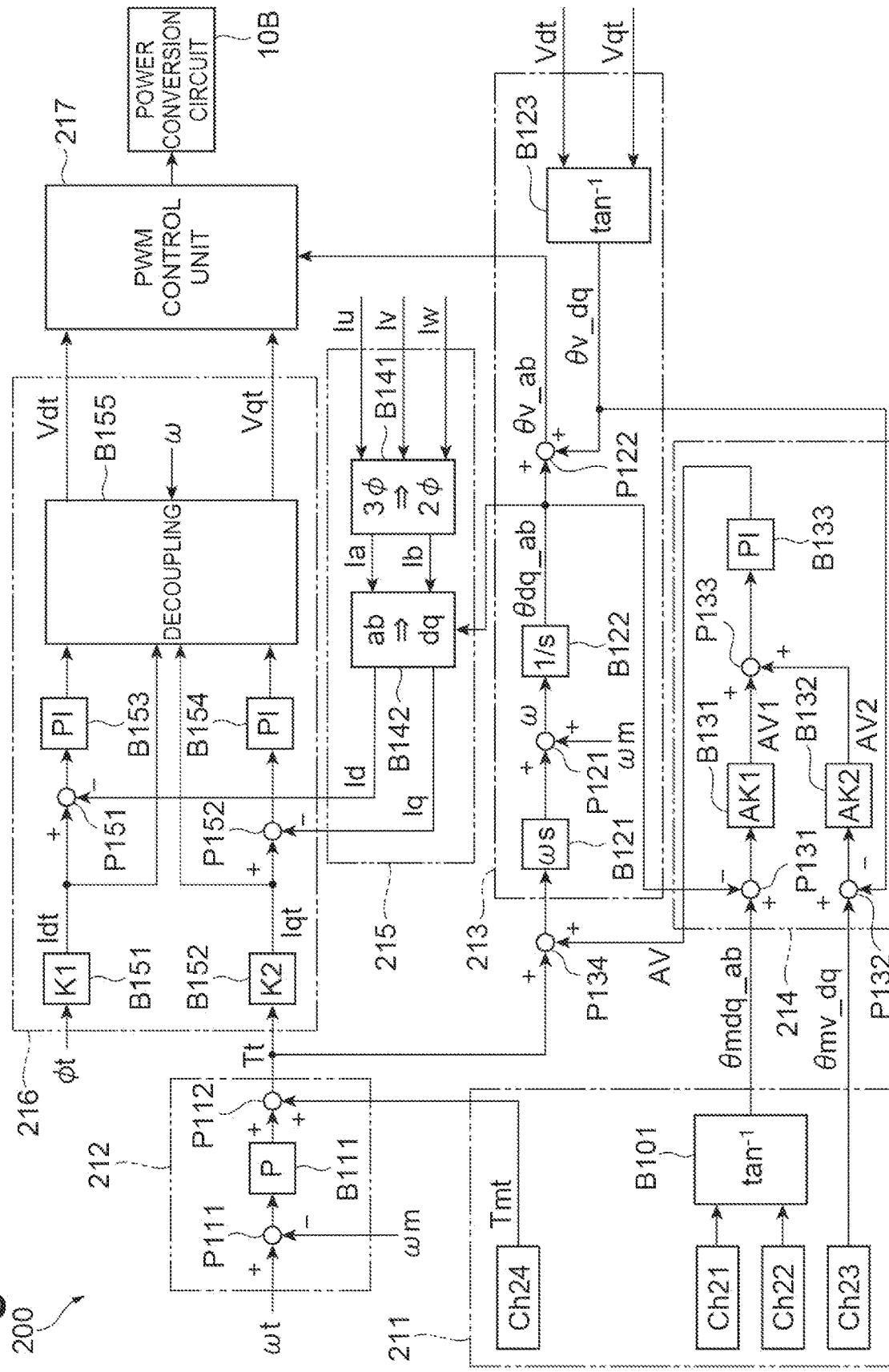
FIG. 5 is a block diagram illustrating an example configuration of a slave control circuit.

The slave control circuit 200 repeatedly executes the above-described control of the power conversion circuit 10B at a predetermined control cycle. As illustrated in FIG. 5, the slave control circuit 200 includes, as functional configurations, a master information acquisition unit 211, a torque target value calculation unit 212, a phase calculation unit 213, a phase correction unit 214, a current information acquisition unit 215, a voltage command generation unit 216, and a PWM control unit 217.

The master information acquisition unit 211 is configured to acquire information on the phase of the master rotating coordinate system from the master control circuit 100 of the power conversion device 4 (the master device). For example, the master information acquisition unit 211 acquires the voltage phase θv_dq in the master rotating coordinate system from the master control circuit 100. Hereinafter, the voltage phase θv_dq acquired from the master control circuit 100 is referred to as "a master voltage phase θmv_dq" in order to distinguish it from the voltage phase θv_dq calculated by the slave control circuit 200. As an example, the master information acquisition unit 211 acquires an analog signal indicating the master voltage phase θmv_dq from an input channel CH23 connected to the output channel CH13.

The master information acquisition unit 211 may obtain a signal indicating a master coordinate phase θmdq_ab itself, which is the phase of the master rotating coordinate system, from the master control circuit 100. As the signal indicating the master coordinate phase θmdq_ab itself, the master information acquisition unit 211 may acquire a sine value of the master coordinate phase θmdq_ab and a cosine value of the master coordinate phase θmdq_ab from the power conversion device 4. As an example, the master information acquisition unit 211 acquires an analog signal indicating the sine value of the master coordinate phase θmdq_ab from an input channel CH21 connected to the output channel CH11, and acquires an analog signal indicating the cosine value of the master coordinate phase θmdq_ab from an input channel CH22 connected to the output channel CH12. The master information acquisition unit 211 calculates the master coordinate phase θmdq_ab based on the sine value of the master coordinate phase θmdq_ab and the cosine value of the master coordinate phase θmdq_ab, as indicated by a transfer block B101.

A delay due to a communication delay or the like may occur from the output of information by the master information output unit 116 to the acquisition of information by the master information acquisition unit 211. In this case, the master information acquisition unit 211 may perform delay compensation on the master coordinate phase θmdq_ab based on the angular frequency command and the delay time.

The master information acquisition unit 211 may further obtain a master torque target value Tmt from the master control circuit 100. For example, the master information acquisition unit 211 acquires an analog signal indicating the master torque target value Tmt from an input channel CH24 connected to the output channel CH14.

The torque target value calculation unit 212 is configured to calculate the torque target value Tt corresponding to the torque target value in the master control circuit 100. For example, the torque target value calculation unit 212 sets the master torque target value Tmt acquired by the master information acquisition unit 211 as the torque target value Tt in the slave control circuit 200. The torque target value calculation unit 212 may correct the torque target value Tt based on the speed command value ωt and the speed feedback value ωm. For example, the torque target value calculation unit 212 may calculate a deviation (a speed deviation) between the speed command value ωt and the speed feedback value ωm as indicated by an addition point P111, calculate a correction value by performing proportional calculation on the speed deviation as indicated by a transfer block B111, and correct the torque target value Tt by adding the correction value as indicated by an addition point P112. In addition, the torque target value calculation unit 212 may calculate a torque limit value Tlim based on a deviation between a speed limit target value ωlim obtained by adding a bias value ωab to the speed command value ωt and the speed feedback value ωm, and set the smaller one of the torque target value Tt and the torque limit value Tlim as the torque target value Tt.

The phase calculation unit 213 (a slave phase calculation unit) is configured to calculate the phase (the coordinate phase θdq_ab) of the rotating coordinate system based on the torque target value Tt and the rotational speed (the speed feedback value ωm described above) of the electric motor 3. The rotating coordinate system is a coordinate system which rotates in synchronization with the second rotating magnetic field. For example, the rotating coordinate system is a dq coordinate system having a d-axis and a q-axis intersecting a central axis of rotation of the rotor 70. The d-axis and the q-axis are coordinate axes perpendicular to each other.

The phase calculation unit 213 may calculate the angular frequency command value ω of the rotating coordinate system based on the torque target value Tt and the speed feedback value ωm, and may calculate the coordinate phase θdq_ab by integrating the angular frequency command value ω. For example, the phase calculation unit 213 calculates a slip angular speed of the rotor 70 with respect to the rotating coordinate system based on the torque target value Tt as indicated by a transfer block B121, and calculates the angular frequency command value ω by adding the speed feedback value ωm to the slip angular speed as indicated by an addition point P121. Further, the phase calculation unit 213 integrates the angular frequency command value ω to calculate the coordinate phase θdq_ab as indicated by a transfer block B122.

The phase calculation unit 213 may calculate the voltage phase θv_ab in the fixed coordinate system based on the voltage phase θv_dq and the coordinate phase θdq_ab in the rotating coordinate system. For example, the phase calculation unit 213 calculates the voltage phase θv_dq based on the voltage command value Vdt and the voltage command value Vqt calculated in the previous control cycle as indicated by a transfer block B123. The voltage command value Vdt is a d-axis component of the voltage command vector, and the voltage command value Vqt is a q-axis component of the voltage command vector. The phase calculation unit 213 calculates the voltage phase θv_ab by adding the voltage phase θv_dq to the coordinate phase θdq_ab as indicated by an addition point P122.

The phase correction unit 214 is configured to correct the coordinate phase θdq_ab of the rotating coordinate system to follow the phase of the master rotating coordinate system. The phase correction unit 214 corrects the phase of the rotating coordinate system based on the master voltage phase θmv_dq that is the phase of the master voltage command in the master rotating coordinate system. For example, the phase correction unit 214 corrects the phase of the rotating coordinate system based on the difference between the master voltage phase θmv_dq and the voltage phase θv_dq that is the phase of the calculated voltage command in the rotating coordinate system.

The phase correction unit 214 may correct the angular frequency command value ω based on the master voltage phase θmv_dq. In this case, the phase correction unit 214 may calculate the corrected coordinate phase θdq_ab by integrating the corrected angular frequency command value ω.

The phase correction unit 214 may correct the coordinate phase θdq_ab based on the master coordinate phase θmdq_ab of the master rotating coordinate system when the rotational speed (the angular frequency command value ω) of the rotating coordinate system is within a first band (or lower than a first threshold), and correct the coordinate phase θdq_ab based on the master voltage phase θmv_dq that is the phase in the master rotating coordinate system of the master voltage command when the rotational speed (the coordinate rotation speed) of the rotating coordinate system is within a second band higher than the first band (or higher than a second threshold that is higher than the first threshold). For example, the phase correction unit 214 corrects the coordinate phase θdq_ab based on a first deviation (a rotation phase difference) that is a difference between the master coordinate phase θmdq_ab (the master rotation phase) and the coordinate phase θdq_ab (the slave rotation phase) when the rotational speed of the rotating coordinate system is within the first band, and corrects the coordinate phase θdq_ab based on a second deviation (a command phase deviation) that is a difference between the master voltage phase θmv_dq (the master command phase) and the voltage phase θv_dq (the slave command phase) when the rotational speed of the rotating coordinate system is within the second band.

The phase correction unit 214 may correct the coordinate phase θdq_ab based on a weighted average value of the first deviation and the second deviation when the rotational speed of the rotating coordinate system is within an intermediate band between the first band and the second band, and may gradually decrease the weight of the first deviation and gradually increase the weight of the second deviation as the rotational speed of the rotating coordinate system approaches an upper limit of the intermediate band from a lower limit of the intermediate band.

The phase correction unit 214 may correct the angular frequency command value ω based on the first deviation when the rotational speed of the rotating coordinate system is within the first band, and correct the angular frequency command value ω based on the second deviation when the rotational speed of the rotating coordinate system is within the second band. In these cases, the phase correction unit 214 may calculate the corrected coordinate phase θdq_ab by integrating the corrected angular frequency command value ω.

The phase correction unit 214 may correct the coordinate phase θdq_ab based on a sine value of the master coordinate phase θmdq_ab and a cosine value of the master coordinate phase θmdq_ab when the rotational speed of the rotating coordinate system is within the first band. For example, the phase correction unit 214 may correct the coordinate phase θdq_ab based on the master coordinate phase θmdq_ab calculated by the master information acquisition unit 211.

As an example, the phase correction unit 214 calculates the first deviation by subtracting the coordinate phase θdq_ab from the master coordinate phase θmdq_ab as indicated by an addition point P131, and calculates a correction value AV1 by multiplying the first deviation by a gain AK1 as indicated by a transfer block B131. The phase correction unit 214 calculates the second deviation by subtracting the voltage phase θv_dq from the master voltage phase θmv_dq as indicated by an addition point P132, and calculates a correction value AV2 by multiplying the second deviation by a gain AK2 as indicated by a transfer block B132. Further, the phase correction unit 214 adds correction values AV1, AV2 as indicated by an addition point P133, and performs a proportional operation, a proportional-integral operation, or a proportional-integral-derivative operation, or the like on the sum of the correction values AV1, AV2 as indicated by a transfer block B133, for example, to calculate a correction value AV. The phase correction unit 214 may calculate the correction value AV by performing a proportional operation, a proportional-integral operation, a proportional-integral-derivative operation, or the like on each of the correction values AV1, AV2 and then adding the operation results.

The phase correction unit 214 adds the correction value AV to the torque target value Tt before being input to the transfer block B121 of the phase calculation unit 213, as indicated by an addition point P134. By adding the correction value AV to the torque target value Tt, the angular frequency command value ω calculated via the transfer block B121 is corrected.

The gain AK1 is determined based on a first gain profile predetermined to represent the relationship between the rotational speed of the rotating coordinate system and the magnitude of the gain AK1, and the rotational speed of the rotating coordinate system. The first gain profile may be a function, or may be discrete point sequence data. For example, the phase correction unit 214 extracts the gain AK1 corresponding to the rotational speed of the rotating coordinate system in the first gain profile.

Similarly, the gain AK2 is determined based on a second gain profile predetermined to represent a relationship between the rotational speed of the rotating coordinate system and the magnitude of the gain AK2, and the rotational speed of the rotating coordinate system. The second gain profile may be a function, or may be discrete point sequence data. For example, the phase correction unit 214 extracts the gain AK2 corresponding to the rotational speed of the rotating coordinate system in the second gain profile.

Figure 8A:
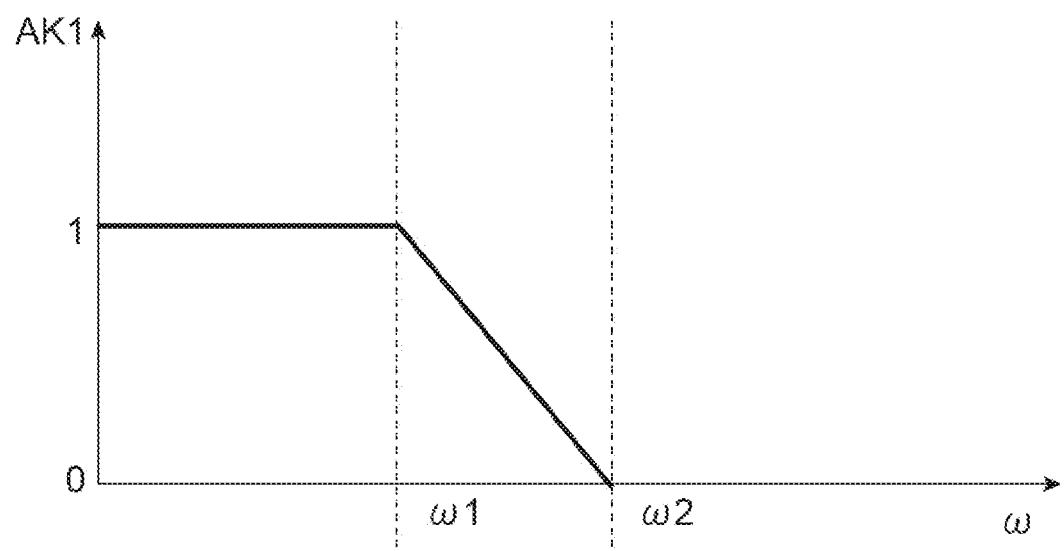
FIGS. 8A and 8B are graphs illustrating an example relationship between a rotational speed of an induction motor and a correction gain.
Figure 8B:
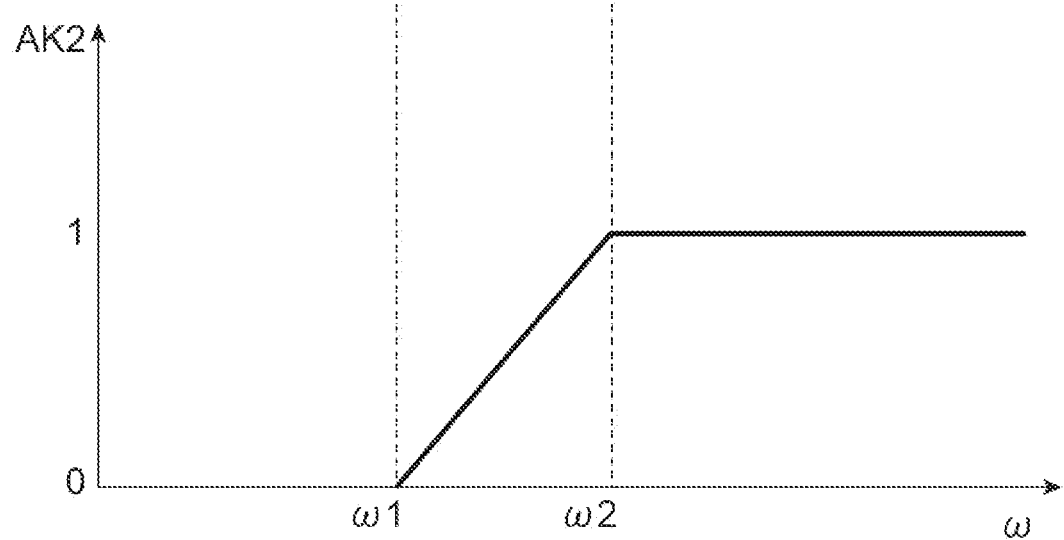

FIG. 8A is a graph illustrating the first gain profile, in which the horizontal axis indicates the rotational speed of the rotating coordinate system and the vertical axis indicates the magnitude of the gain AK1. FIG. 8B is a graph illustrating the second gain profile, in which the horizontal axis indicates the rotational speed of the rotating coordinate system and the vertical axis indicates the magnitude of the gain AK2.

In FIG. 8A, the gain AK1 is set to one when the rotational speed of the rotating coordinate system is within a first band of a first threshold ω1 or less, and is set to zero when the rotational speed of the rotating coordinate system is within a second band of a second threshold ω2 or more, which is larger than the first threshold ω1. In the intermediate band between the first threshold ω1 and the second threshold ω2, the gain AK1 gradually changes from one to zero as approaching from the first threshold ω1 to the second threshold ω2.

On the other hand, in FIG. 8B, the gain AK2 is set to zero when the rotational speed of the rotating coordinate system is within the first band, and is set to one when the rotational speed of the rotating coordinate system is within the second band. In the intermediate band, the gain AK2 gradually changes from zero to one as approaching from the first threshold ω1 to the second threshold ω2.

With the above configuration, when the rotational speed of the rotating coordinate system is within the first band, the correction value AV is calculated based on the first deviation, and when the rotational speed of the rotating coordinate system is within the second band, the correction value AV is calculated based on the second deviation. When the rotational speed of the rotating coordinate system is within the intermediate band, the correction value AV is calculated based on the weighted average value of the first deviation and the second deviation, and as the rotational speed of the rotating coordinate system approaches the upper limit of the intermediate band from the lower limit of the intermediate band, the weight of the first deviation gradually decreases and the weight of the second deviation gradually increases.

Returning to FIG. 5, the current information acquisition unit 215 is configured to calculate the current feedback values Id, Iq based on the current feedback values Iu, Iv, Iw detected by the current sensor 40 of the power conversion circuit 10B. For example, the current information acquisition unit 215 calculates the current feedback value Ia and the current feedback value Ib by performing three-phase to two-phase transformation on the current feedback values Iu, Iv, Iw as indicated by a transfer block B141. As indicated by a transfer block B142, the current feedback values Ia, Ib are subjected to rotational transformation by the corrected coordinate phase θdq_ab to calculate the current feedback values Id, Iq.

The slave voltage command generation unit 216 (a voltage command generation unit) is configured to generate a voltage command in the rotating coordinate system based on the torque target value Tt. For example, the voltage command generation unit 216 multiplies a predetermined magnetic flux target value Φ by the gain K1 to calculate the current target value Idt as indicated by a transfer block B151, and multiplies the torque target value Tt by the gain K2 to calculate the current target value Iqt as indicated by a transfer block B152.

The voltage command generation unit 216 generates a voltage command so that the current feedback value Id follows the current target value Idt and the current feedback value Iq follows the current target value Iqt. For example, the voltage command generation unit 216 calculates a d-axis current deviation, which is a deviation between the current target value Idt and the current feedback value Id, as indicated by an addition point P151, and calculates the voltage command value Vdt by performing proportional operation, proportional-integral operation, or proportional-integral-derivative operation on the d-axis current deviation, as indicated by a transfer block B153, for example.

The voltage command generation unit 216 calculates a q-axis current deviation, which is a deviation between the current target value Iqt and the current feedback value Iq, as indicated by an addition point P152, and calculates the voltage command value Vqt by performing, for example, a proportional operation, a proportional-integral operation, or a proportional-integral-derivative operation on the q-axis current deviation, as indicated by a transfer block B154.

The voltage command generation unit 216 may perform decoupling of the voltage command between the d-axis and the q-axis based on the current target values Idt, Iqt and the angular frequency command value ω as indicated by a transfer block B155. For example, the voltage command generation unit 216 may correct the voltage command value Vdt based on the current target value Iqt, the equivalent leakage inductance l (l=(L1*L2−M2)/L2), and the angular frequency command value ω, and correct the voltage command value Vqt based on the V/f pattern and the angular frequency command value ω, thereby performing decoupling between the d-axis and the q-axis. In addition, the voltage command generation unit 216 may use the current feedback values Id, Iq instead of the current target value Idt and Iqt when performing the decoupling.

In this way, also in the power conversion device 5, the voltage command values Vdt, Vqt are calculated based on the torque target value Tt, the magnetic flux target value Φt, and the current feedback values Id, Iq. In addition, the current feedback values Id, Iq are calculated by performing rotation conversion on the current feedback values Ia, Ib using the coordinate phase θdq_ab. Therefore, it can be said that the voltage command values Vdt, Vqt are calculated based on the coordinate phase θdq_ab.

The PWM control unit 217 is configured to control the secondary side voltage of the power conversion circuit 10B to correspond to the voltage command based on the corrected coordinate phase θdq_ab and the voltage command in the rotating coordinate system with the corrected phase θdq_ab. For example, the PWM control unit 217 calculates a voltage command of each phase (U phase, V phase, and W phase) of the secondary side based on the corrected coordinate phase θdq_ab and the voltage command values Vdt, Vqt, and switches on and off the bidirectional switches 20RU, 20SU, 20TU, 20RV, 20SV, 20TV, 20RW, 20SW, 20TW of the power conversion circuit 10B so that the voltage of each phase of the secondary side corresponds to the voltage command.

Figure 6:
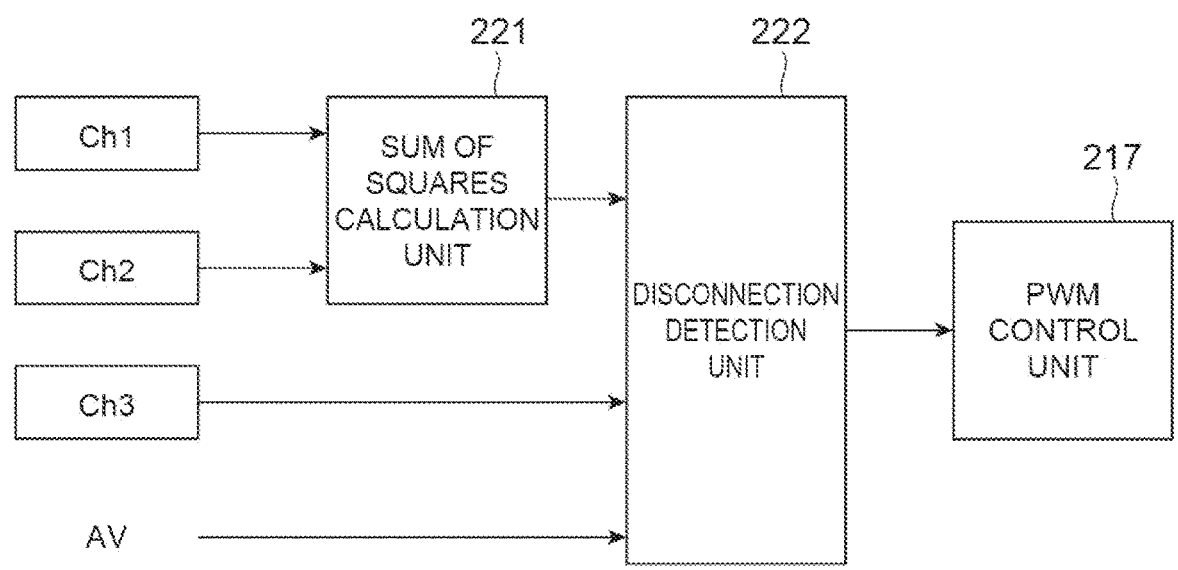
FIG. 6 is a diagram illustrating a modified example of the slave control circuit.

The slave control circuit 200 may be configured to detect a communication abnormality with the master control circuit 100. For example, as illustrated in FIG. 6, the slave control circuit 200 includes an abnormality monitoring unit 220.

The abnormality monitoring unit 220 may detect an abnormality of a communication path (for example, between output channels CH11, CH12 and input channels CH21, CH22) for acquiring the sine value of the master coordinate phase θmdq_ab and the cosine value of the master coordinate phase θmdq_ab based on the degree to which the sum of the square of the sine value of the master coordinate phase θmdq_ab and the square of the cosine value of the master coordinate phase θmdq_ab deviates from one. The abnormality monitoring unit 220 may detect an abnormality of a communication path for acquiring the master voltage phase θmv_dq (for example, between the output channel CH13 and the input channel CH23) when the master voltage phase θmv_dq is smaller than a predetermined level.

For example, the abnormality monitoring unit 220 includes a sum of squares calculation unit 221 and a disconnection detection unit 222. The sum of squares calculation unit 221 is configured to calculate the sum of the square of the sine value of the master coordinate phase θmdq_ab and the square of the cosine value of the master coordinate phase θmdq_ab. The disconnection detection unit 222 is configured to detect a disconnection between the output channels CH11, CH12 and the input channels CH21, CH22 when the deviation of the calculation result by the sum of squares calculation unit 221 from one exceeds a predetermined threshold value. The disconnection detection unit 222 is configured to detect a disconnection between the output channel CH13 and the input channel CH23 when the master voltage phase θmv_dq is smaller than a predetermined level.

The abnormality monitoring unit 220 may be configured to further detect an abnormality of a communication path for acquiring the master torque target value Tmt (for example, between the output channel CH14 and the input channel CH24). For example, the abnormality monitoring unit 220 detects the abnormality of the communication path for acquiring the master torque target value Tmt based on the first deviation when the rotational speed of the rotating coordinate system is within the first band, and detects the abnormality of the communication path for acquiring the master torque target value Tmt based on the second deviation when the rotational speed of the rotating coordinate system is within the second band. When the rotational speed of the rotating coordinate system is within the intermediate band, the abnormality monitoring unit 220 may detect an abnormality of the communication path for acquiring the master torque target value Tmt based on the weighted average value of the first deviation and the second deviation.

For example, the disconnection detection unit 222 detects disconnection between the output channel CH14 and the input channel CH24 when the rotational speed of the rotating coordinate system is within the first band and the first deviation exceeds a predetermined level. The disconnection detection unit 222 detects the disconnection between the output channel CH14 and the input channel CH24 when the rotational speed of the rotating coordinate system is within the second band and the second deviation exceeds the predetermined level.

When the rotational speed of the rotating coordinate system is within the intermediate band and the weighted average value of the first deviation and the second deviation exceeds a predetermined level, the disconnection detection unit 222 detects the disconnection between the output channel CH14 and the input channel CH24. As an example, the disconnection detection unit 222 detects disconnection between the output channel CH14 and the input channel CH24 when the correction value AV exceeds a predetermined level.

Although the configuration of the power conversion devices 4, 5 has been individually described above, each of the power conversion devices 4, 5 may be configured to function as either the master device or the slave device in accordance with user settings. In this case, although there is no distinction in the configuration of the power conversion devices 4, 5, an example configuration of the power conversion device 5 that can also be used as the master device will be described for convenience.

Figure 7:
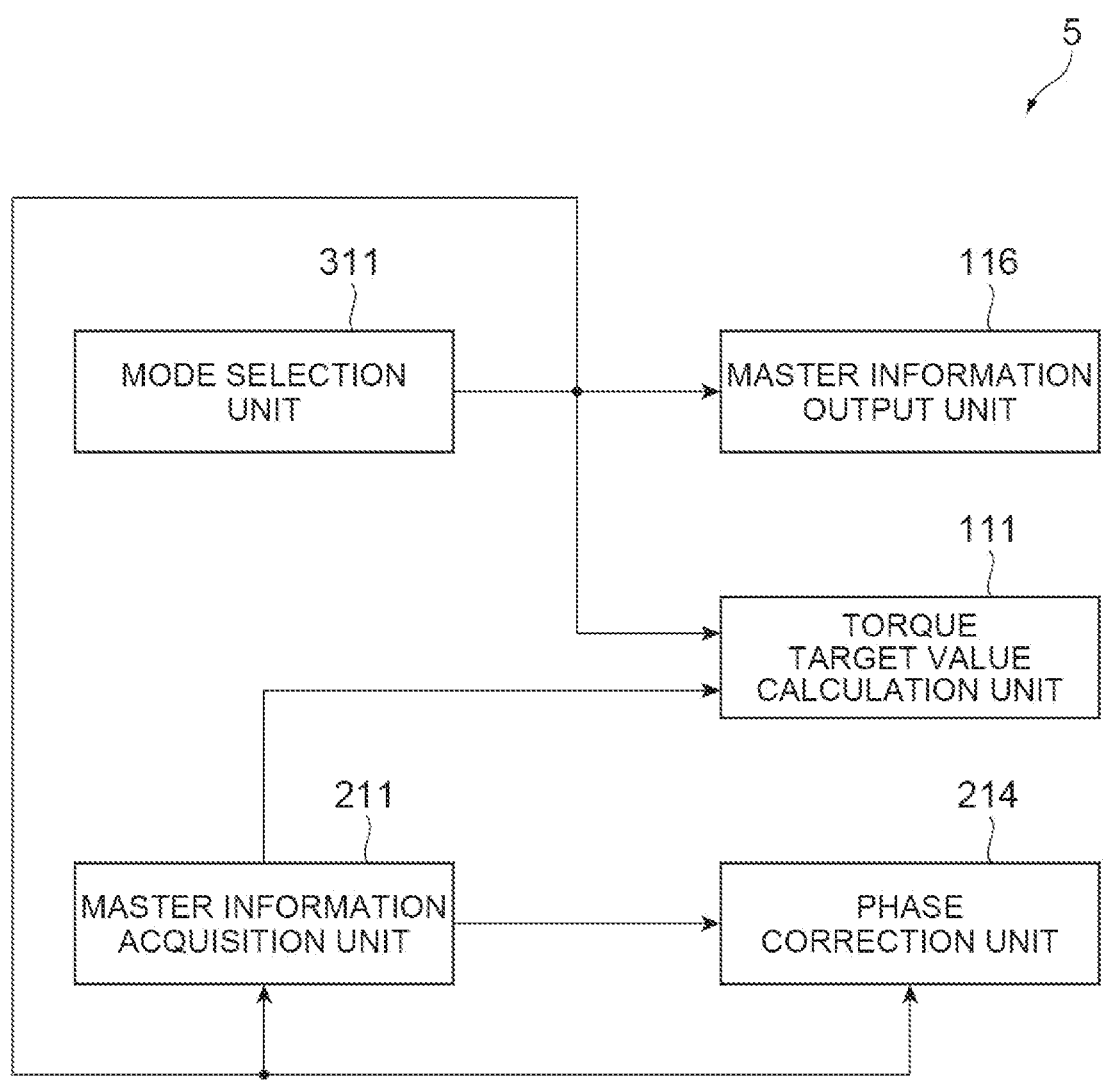
FIG. 7 is a diagram illustrated modified examples of the master control circuit and the slave control circuit.

As illustrated in FIG. 7, the power conversion device 5 that can also be used as the master device further includes the master information output unit 116 and a mode selection unit 311. The mode selection unit 311 is configured to select either the master mode or the slave mode based on a mode selection input (for example, a user input to an input device or the like). When the master mode is selected, the power conversion device 5 functions as the master device. When the slave mode is selected, the power conversion device 5 functions as the slave device.

For example, when the master mode is selected, the mode selection unit 311 disables the functions of the master information acquisition unit 211 and the phase correction unit 214. By disabling the function of the phase correction unit 214, the PWM control unit 217 controls the secondary side voltage of the power conversion circuit 10B to correspond to the voltage command based on the uncorrected coordinate phase $\theta dq\_ab$ and the voltage command. In addition, the mode selection unit 311 causes the torque target value calculation unit 212 to calculate the torque target value in the same manner as the calculation method of the torque target value Tt by the torque target value calculation unit 111 without being based on the master torque target value Tmt. Further, the mode selection unit 311 enables the function of the master information output unit 116. The master information output unit 116 outputs information on the coordinate phase $\theta dq\_ab$ and the torque target value Tt to the slave device.

When the slave mode is selected, the mode selection unit 311 enables the functions of the torque target value calculation unit 111 and the phase correction unit 214, and controls the torque target value calculation unit 212 to calculate the torque target value Tt by the above-described calculation method based on the master torque target value Tmt. When the function of the phase correction unit 214 is enabled, the PWM control unit 217 controls the secondary side voltage of the power conversion circuit 10B to correspond to the voltage command based on the corrected coordinate phase $\theta dq\_ab$ and the voltage command.

Hardware Configuration of the Control System 2

FIG. 9 is a diagram schematically illustrating the hardware configuration of the control system 2. As illustrated in FIG. 9, the master control circuit 100 includes one or more processors 191, a memory 192, storage 193, an input/output port 194, a switching control circuit 195, and a communication port 196. The storage 193 includes a computer-readable storage medium, such as a nonvolatile semiconductor memory. The storage 193 stores a program for causing the master control circuit 100 to execute: calculating a phase of the rotating coordinate system (the master rotating coordinate system) based on the torque target value and the rotational speed of the electric motor 3; generating the voltage command (the master voltage command) in the master rotating coordinate system based on the master torque target value; and controlling the secondary side voltage of the power conversion circuit 10A to correspond to the master voltage command based on the phase of the master rotating coordinate system and the voltage command.

For example, the storage 193 stores a program for configuring the functional units described above in the master control circuit 100.

The memory 192 temporarily stores the program loaded from the storage medium of the storage 193 and the calculation result by the processor(s) 191. The processor(s) 191 configures functional units of the master control circuit 100 by executing the program in cooperation with the memory 192. The input/output port 194 inputs and outputs electrical signals to and from the current sensor 40 in accordance with instructions from the processor(s) 191. The switching control circuit 195 outputs the secondary side power to the electric motor 3 by switching on and off the switching elements in the power conversion circuit 10A in accordance with instructions from the processor(s) 191. The communication port 196 performs information communication with the slave control circuit 200 in accordance with instructions from the processor(s) 191.

The slave control circuit 200 includes one or more processors 291, a memory 292, storage 293, an input/output port 294, a switching control circuit 295, and a communication port 296. The storage 293 includes a computer-readable storage medium, such as a nonvolatile semiconductor memory. The storage 293 stores a program for causing the slave control circuit 200 to repeatedly execute control of the power conversion circuit 10B at a predetermined control cycle. For example, the storage 293 stores a program for configuring the functional units described above in the slave control circuit 200.

The memory 292 temporarily stores the program loaded from the storage medium of the storage 293 and the calculation result by the processor(s) 291. The processor(s) 291 configures functional units of the slave control circuit 200 by executing the program in cooperation with the memory 292. The input/output port 294 inputs and outputs electrical signals to and from the current sensor 40 in accordance with instructions from the processor(s) 291. The switching control circuit 295 outputs the secondary side power to the electric motor 3 by switching on and off a plurality of switching elements in the power conversion circuit 10B in accordance with instructions from the processor(s) 291. The communication port 296 performs information communication with the master control circuit 100 in accordance with instructions from the processor(s) 291.

It should be noted that the master control circuit 100 may not be limited to one that configures each function by a program. For example, the master control circuit 100 may configure at least a part of functions by a dedicated logic circuit or an application specific integrated circuit (ASIC) in which the dedicated logic circuit is integrated.

Control Procedure

Next, as an example of the control method, a master control procedure executed by the master control circuit 100 and a slave control procedure executed by the slave control circuit 200 will be described.

Master Control Procedure

The procedure includes: calculating the phase of the rotating coordinate system based on the torque target value and the rotational speed of the electric motor 3; generating the voltage command in the rotating coordinate system based on the torque target value; controlling the secondary side voltage of the power conversion circuit to correspond to the voltage command based on the phase of the rotating coordinate system and the voltage command; and outputting at least the phase of the voltage command in the rotating coordinate system to the slave control circuit 200 as information about the phase of the rotating coordinate system.

Figure 10:
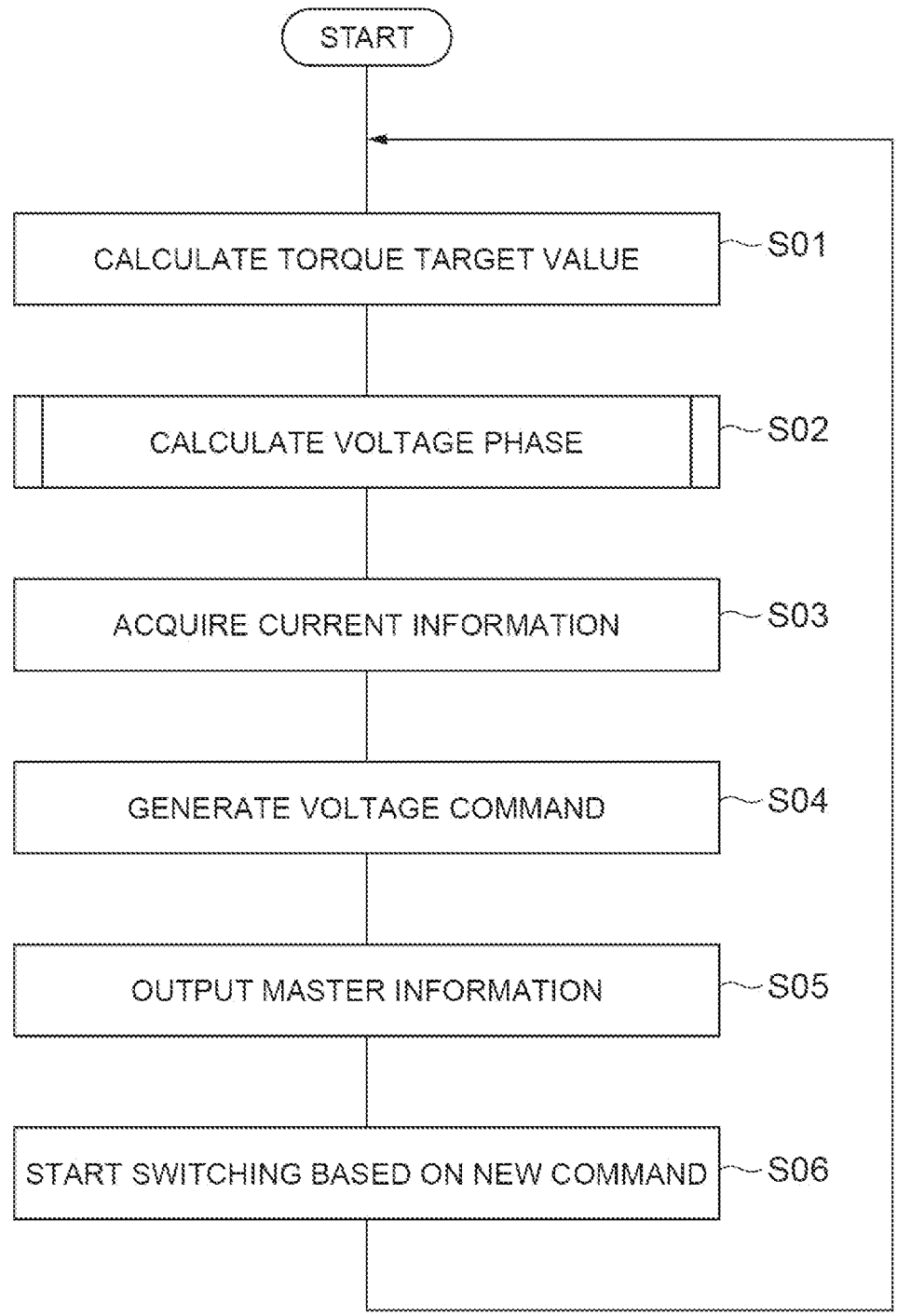
FIG. 10 is a flowchart illustrating an example control procedure of the power conversion circuit by the master control circuit.

For example, as illustrated in FIG. 10, the master control circuit 100 sequentially executes operations S01, S02, S03, S04, S05, S06. In the operation S01, the torque target value calculation unit 111 calculates the torque target value based on the speed command value ωt and the speed feedback value ωm.

In the operation S02, the phase calculation unit 112 calculates the coordinate phase θdq_ab based on the torque target value Tt and the rotational speed in the electric motor 3. The phase calculation unit 112 may calculate the voltage phase θv_ab in the fixed coordinate system based on the voltage phase θv_dq and the coordinate phase θdq_ab in the rotating coordinate system. In this case, the phase calculation unit 112 uses the voltage phase θv_dq of the voltage command values Vdt, Vqt calculated in the previous control cycle. A detailed procedure of the operation S02 will be described later.

In the operation S03, the current information acquisition unit 113 calculates the current feedback values Id, Iq based on the current feedback values Iu, Iv, Iw detected by the current sensor 40 of the power conversion circuit 10A. For example, the current information acquisition unit 113 calculates the current feedback value Ia and the current feedback value Ib by performing a three-phase to two-phase transformation on the current feedback values Iu, Iv, Iw, and calculates the current feedback values Id, Iq by performing a rotational transformation by the coordinate phase θdq_ab on the current feedback values Ia, Ib. In the operation S04, the voltage command generation unit 114 calculates a voltage command based on the torque target value Tt, the magnetic flux target value Φt, and the current feedback values Id, Iq.

In the operation S05, the master information output unit 116 outputs the voltage phase θv_dq, the sine value of the coordinate phase θdq_ab, the cosine value of the coordinate phase θdq_ab, and the torque target value Tt to the slave control circuit 200.

In the operation S06, the PWM control unit 115 turns on and off the bidirectional switches 20RU, 20SU, 20TU, 20RV, 20SV, 20TV, 20RW, 20SW, 20TW of the power conversion circuit 10A so that the secondary side voltage of the power conversion circuit 10A corresponds to the voltage command newly generated in the operation S04. Thereafter, the master control circuit 100 returns the processing to the operation S01. The master control circuit 100 repeats the above procedure at a predetermined control cycle.

Figure 11:
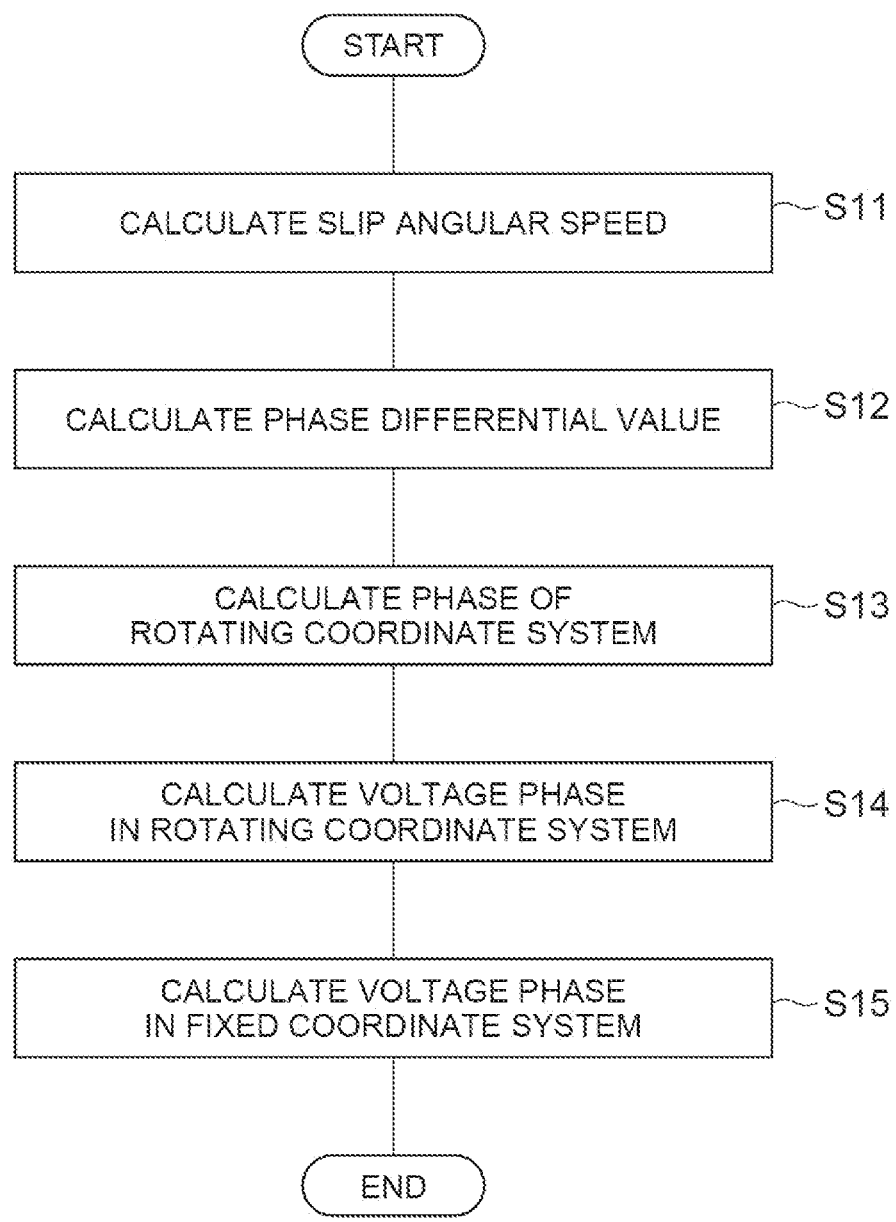
FIG. 11 is a flowchart illustrating an example calculation procedure of a voltage phase.

FIG. 11 is a flowchart illustrating a phase calculation procedure in the operation S02. As illustrated in FIG. 11, the master control circuit 100 sequentially executes operations S11, S12, S13, S14, S15. In the operation S11, the phase calculation unit 112 calculates a slip angular speed of the rotating coordinate system with respect to the rotor 70 based on the torque target value Tt. In the operation S12, the phase calculation unit 112 adds the speed feedback value ωm to the slip angular speed to calculate the angular frequency command value ω. In the operation S13, the phase calculation unit 112 integrates the angular frequency command value ω to calculate the coordinate phase θdq_ab.

In the operation S14, the phase calculation unit 112 calculates the voltage phase θv_dg in the rotating coordinate system based on the voltage command values Vdt, Vqt calculated in the previous control cycle. In the operation S15, the phase calculation unit 112 calculates voltage phase θv_ab in the fixed coordinate system by adding the voltage phase θv_dq to the coordinate phase θdq_ab. Thus, the phase calculation procedure is completed.

Slave Control Procedure

The procedure includes: calculating the phase of the rotating coordinate system based on the torque target value and the rotational speed of the electric motor 3; correcting the phase of the rotating coordinate system to follow the phase of the master rotating coordinate system; generating the voltage command in the rotating coordinate system based on the torque target value; and controlling the secondary side voltage of the power conversion circuit to correspond to the voltage command, and the phase of the rotating coordinate system is corrected based on the phase of the master voltage command generated by the master device in the rotating coordinate system.

Figure 12:
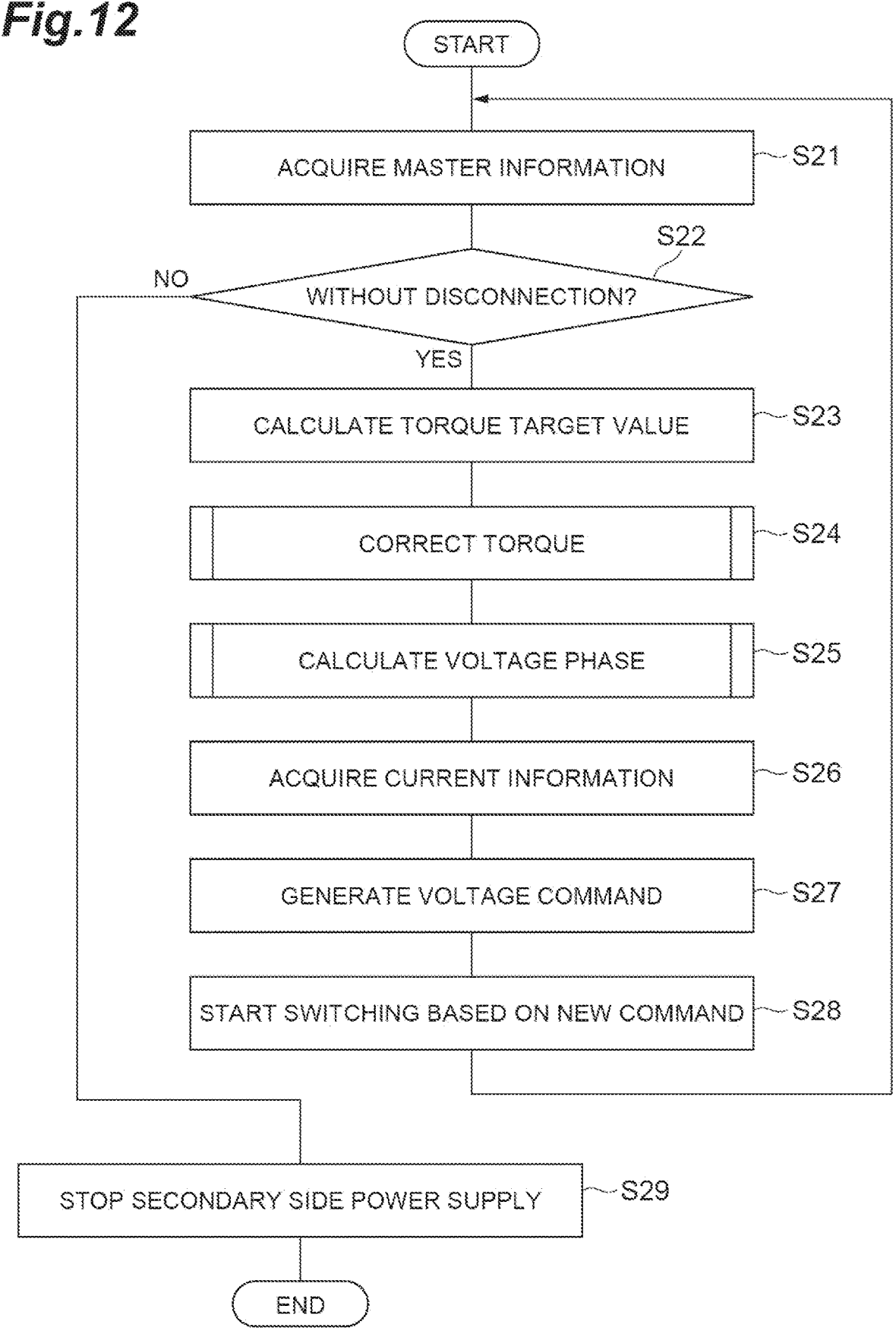
FIG. 12 is a flowchart illustrating an example control procedure of the power conversion circuit by the slave control circuit.

For example, as illustrated in FIG. 12, the slave control circuit 200 first executes operations S21, S22. In the operation S21, the master information acquisition unit 211 acquires at least the master voltage phase θmv_dq in the master rotating coordinate system from the master control circuit 100 as information related to the coordinate phase θdq_ab. The master information acquisition unit 211 may further acquire the sine value of the master coordinate phase θmdq_ab and the cosine value of the master coordinate phase θmdq_ab from the master control circuit 100, and may further acquire the torque target value Tt from the master control circuit 100.

In the operation S22, the abnormality monitoring unit 220 checks whether or not there is a disconnection in the communication path with the master control circuit 100. For example, the abnormality monitoring unit 220 checks whether there is a disconnection between the output channel CH13 and the input channel CH23 based on whether the master voltage phase θmv_dq is smaller than a predetermined level. The abnormality monitoring unit 220 checks whether there is a disconnection between the output channels CH11, CH12 and the input channels CH21, CH22 based on the degree of deviation of the sum of the square of the sine value of the master coordinate phase θmdq_ab and the square of the cosine value of the master coordinate phase θmdq_ab from one. The abnormality monitoring unit 220 checks whether there is a disconnection between the output channel CH14 and the input channel CH24 based on the magnitude of the correction value ΔV.

If the operation S22 determines that there is no disconnection in the communication path, the slave control circuit 200 executes operations S23, S24, S25, S26, S27, S28. In the operation S23, the torque target value calculation unit 212 calculates the torque target value Tt based on the master torque target value Tmt. In the operation S24, the phase correction unit 214 corrects the torque target value Tt before being input to the phase calculation unit 213 based on the master voltage phase θmv_dq and the master coordinate phase θmdq_ab. A detailed procedure of the operation S24 will be described later.

In the operation S25, the phase calculation unit 213 calculates the coordinate phase θdq_ab based on the corrected torque target value Tt and the rotational speed of the electric motor 3. The phase calculation unit 213 may calculate the voltage phase θv_ab in the fixed coordinate system based on the voltage phase θv_dq and the coordinate phase θdq_ab in the rotating coordinate system. In this case, the phase calculation unit 112 uses the voltage phase θv_dq of the voltage command values Vdt, Vqt calculated in the previous control cycle. A detailed procedure of the operation S25 will be described later.

In the operation S26, the current information acquisition unit 215 calculates the current feedback values Id, Iq based on the current feedback values Iu, Iv, Iw detected by the current sensor 40 of the power conversion circuit 10B. For example, the current information acquisition unit 215 calculates the current feedback value Ia and the current feedback value Ib by performing a three-phase to two-phase transformation on the current feedback values Iu, Iv, Iw, and calculates the current feedback values Id, Iq by performing a rotational transformation by the coordinate phase θdq_ab on the current feedback values Ia, Ib.

In the operation S27, the voltage command generation unit 216 calculates the voltage command based on the torque target value Tt, the magnetic flux target value Φt, and the current feedback values Id, Iq. In the operation S28, the PWM control unit 217 turns on and off the bidirectional switches 20RU, 20SU, 20TU, 20RV, 20SV, 20TV, 20RW, 20SW, 20TW of the power conversion circuit 10B so that the secondary side voltage of the power conversion circuit 10B corresponds to the voltage command newly generated in the operation S27. Thereafter, the slave control circuit 200 returns the processing to the operation S21. The slave control circuit 200 repeats the above-described procedure at a predetermined control cycle unless a disconnection is detected in the operation S22.

If the operation S22 determines that the communication path is disconnected, the slave control circuit 200 executes a operation S29. In the operation S29, the PWM control unit 217 stops the supply of the secondary side current to the electric motor 3. For example, the PWM control unit 217 sets each of the bidirectional switches 20RU, 20SU, 20TU, 20RV, 20SV, 20TV, 20RW, 20SW, 20TW to the bi-directional OFF state and ends the control of the power conversion circuit 10B.

Figure 13:
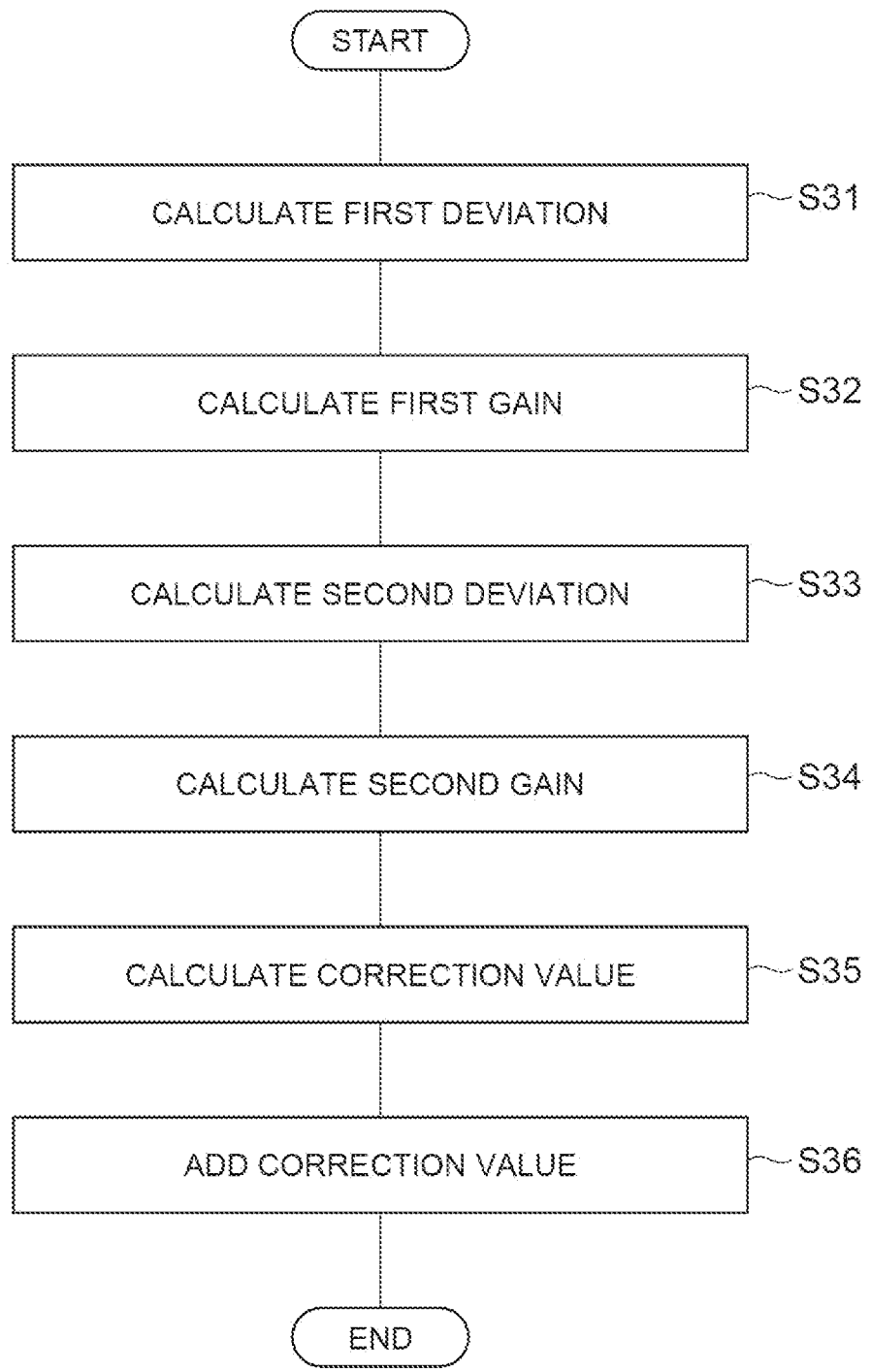
FIG. 13 is a flowchart illustrating an example torque correction procedure.

FIG. 13 is a flowchart illustrating a correction procedure of the torque target value Tt in the operation S24. As illustrated in FIG. 13, the slave control circuit 200 sequentially executes operations S31, S32, S33, S34, S35. In the operation S31, the phase correction unit 214 subtracts the coordinate phase θdq_ab from the master coordinate phase θmdq_ab to calculate the first deviation. At this time, the phase correction unit 214 uses the coordinate phase θdq_ab calculated in the previous control cycle. In the operation S32, the phase correction unit 214 calculates the gain AK1 based on the above-described first gain profile and the rotational speed of the rotating coordinate system.

In the operation S33, the phase correction unit 214 subtracts the voltage phase θv_dq from the master voltage phase θmv_dq to calculate the second deviation. In the operation S34, the phase correction unit 214 calculates the gain AK2 based on the above-described second gain profile and the rotational speed of the rotating coordinate system.

In the operation S35, the phase correction unit 214 calculates the weighted average value of the first deviation and the second deviation by the gain AK1 and the gain AK2, and performs proportional operation, proportional-integral operation, proportional-integral-derivative operation, or the like on the weighted average value to calculate the correction value AV. As described above, when the rotational speed of the rotating coordinate system is within the first band, the gain AK1 is one and the gain AK2 is zero. Further, when the rotational speed of the rotating coordinate system is within the second band, the gain AK1 is zero and the gain AK2 is one. Therefore, when the rotational speed of the rotating coordinate system is within the first band, the correction value AV is calculated substantially based on the first deviation, when the rotational speed of the rotating coordinate system is within the second band, the correction value AV is calculated substantially based on the second deviation, and when the rotational speed of the rotating coordinate system is within the intermediate band, the correction value AV is calculated based on the weighted average value of the first deviation and the second deviation. In a operation S36, the phase correction unit 214 adds the correction value AV to the torque target value Tt before being input to the phase calculation unit 213. Thus, the correction procedure of the torque target value Tt is completed.

Figure 14:
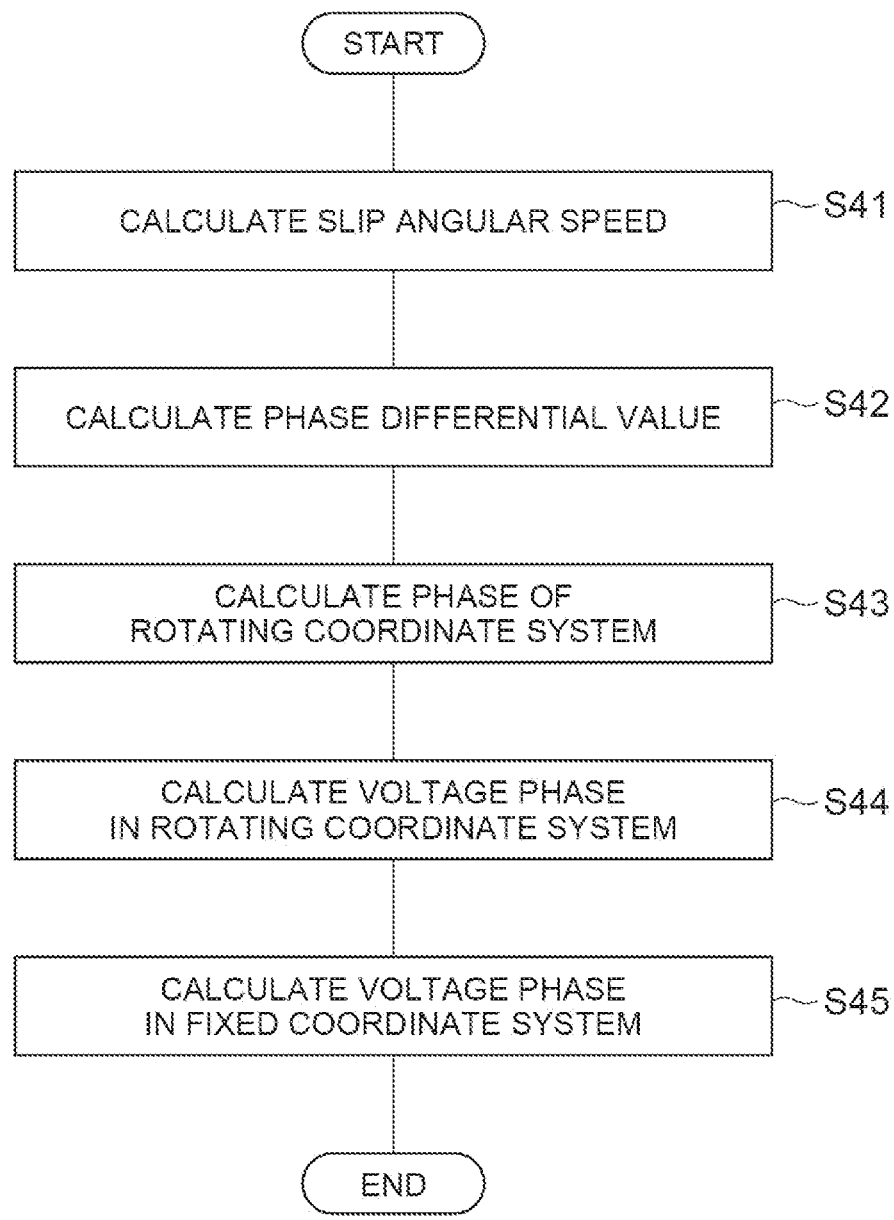
FIG. 14 is a flowchart illustrating an example calculation procedure of the voltage phase.

FIG. 14 is a flowchart illustrating a phase calculation procedure in the operation S25. As illustrated in FIG. 14, the slave control circuit 200 sequentially executes an operations S41, S42, S43, S44, S45. In the operation S41, the phase calculation unit 213 calculates the slip angular speed of the rotating coordinate system with respect to the rotor 70 based on the torque target value Tt to which the correction value AV is added. In the operation S42, the phase calculation unit 213 adds the speed feedback value ωm to the slip angular speed to calculate the angular frequency command value ω. In the operation S43, the phase calculation unit 213 integrates the angular frequency command value ω to calculate the coordinate phase θdq_ab.

In the operation S44, the phase calculation unit 213 calculates the voltage phase θv_dq in the rotating coordinate system based on the voltage command values Vdt, Vqt calculated in the previous control cycle. In the operation S45, the phase calculation unit 213 calculates voltage phase θv_ab in the fixed coordinate system by adding the voltage phase θv_dq to the coordinate phase θdq_ab. Thus, the phase calculation procedure is completed.

As described above, the power conversion device 5 includes: the power conversion circuit 10B that converts the primary side power into the secondary side power and supplies the secondary side power to the induction motor; the phase calculation unit 213 that calculates the phase of the rotating coordinate system based on the torque target value and the rotational speed of the motor 3 (the electric motor); the phase correction unit 214 that corrects the phase of the rotating coordinate system to follow the phase of the master rotating coordinate system that is the rotating coordinate system in the power conversion device 4 (the master device); the voltage command generation unit 216 that generates the voltage command in the rotating coordinate system based on the corrected phase of the rotating coordinate system and the voltage command; and the PWM control unit 217 (the control unit) that controls the secondary side voltage of the power conversion circuit 10B to correspond to the voltage command based on the corrected phase of the rotating coordinate system and the voltage command. The phase correction unit 214 corrects the phase of the rotating coordinate system based on the phase of the master rotating coordinate system of the master voltage command generated by the power conversion device 4 (the master device).

By controlling the phase of the rotating coordinate system in the power conversion device 5 to follow the phase of the master rotating coordinate system, the rotating magnetic field (a second rotating magnetic field) generated in the electric motor 3 (the induction motor) by the power conversion device 5 can be synchronized with the rotating magnetic field (a first rotating magnetic field) generated in the electric motor 3 by the power conversion device 4 (master device). However, as the rotational speed of the electric motor 3 increases, the changing speed of the phase of the master rotating coordinate system increases, and thus it is difficult to receive the information of the phase of the master rotating coordinate system with accuracy.

In response to this, with the power conversion device 5, the phase of the rotating coordinate system (hereinafter referred to as a "slave rotating coordinate system") is corrected based on the phase in the master rotating coordinate system of the master voltage command generated by the power conversion device 4.

Although the voltage phase in the master rotating coordinate system is not information indicating the phase itself of the master rotating coordinate system, the deviation of the phase of the slave rotating coordinate system with respect to the phase of the master rotating coordinate system may be grasped based on the voltage phase in the master rotating coordinate system. Therefore, by correcting the calculation result of the phase of the slave rotating coordinate system based on the voltage phase in the master rotating coordinate system, the slave rotating coordinate system can easily follow the master rotating coordinate system.

Even if the rotational speed of the electric motor 3 increases, the change in the master voltage phase does not increase. Therefore, by correcting the phase of the slave rotating coordinate system based on the voltage phase in the master rotating coordinate system, the second rotating magnetic field may be synchronized with the first rotating magnetic field with reliability. Accordingly, rotating magnetic fields respectively generated in the induction motor by the plurality of power conversion devices may be synchronized.

The phase correction unit 214 may correct the phase of the rotating coordinate system based on the phase of the master rotating coordinate system when the rotational speed of the rotating coordinate system is within the first band, and correct the phase of the rotating coordinate system based on the phase of the master voltage command in the master rotating coordinate system when the rotational speed of the rotating coordinate system is within the second band that is higher than the first band.

When the rotational speed of the rotating coordinate system is low, the variation in the instantaneous value of the master voltage phase increases, and it may be difficult to cause the slave rotating coordinate system to follow the master rotating coordinate system based on the master voltage phase. In contrast, in a case where the rotational speed of the rotating coordinate system is within the first band lower than the second band, the phase of the rotating coordinate system is corrected based on the phase of the master rotating coordinate system, and thus the influence of the variation in the master voltage phase may be suppressed.

When the rotational speed of the rotating coordinate system is low, information of the phase of the master rotating coordinate system may be received with accuracy. Therefore, by causing the phase of the slave rotating coordinate system to follow the phase of the master rotating coordinate system based on the phase of the master rotating coordinate system, the second rotating coordinate system can be synchronized with the first rotating coordinate system with reliability.

The phase correction unit 214 may correct the phase of the rotating coordinate system based on the first deviation that is a difference between the phase of the master rotating coordinate system and the phase of the rotating coordinate system when the rotational speed of the rotating coordinate system is within the first band, and correct the phase of the rotating coordinate system based on the second deviation that is a difference between the phase of the master rotating coordinate system of the master voltage command and the phase of the rotating coordinate system of the voltage command when the rotational speed of the rotating coordinate system is within the second band. In this case, the correction method based on the phase of the master rotating coordinate system (hereinafter referred to as "a first correction method") and the correction method based on the phase of the master rotating coordinate system of the master voltage command (hereinafter referred to as "a second correction method") are made common in terms of correcting the phase of the rotating coordinate system based on the deviation, whereby switching between both methods can be smoothly performed.

The phase correction unit 214 may correct the phase of the rotating coordinate system based on a weighted average value of the first deviation and the second deviation when the rotational speed of the rotating coordinate system is within the intermediate band between the first band and the second band, and may gradually decrease the weight of the first deviation and gradually increase the weight of the second deviation as the rotational speed of the rotating coordinate system approaches the upper limit of the intermediate band from the lower limit of the intermediate band. In this case, switching between the first correction method and the second correction method can be performed more smoothly.

The phase calculation unit 213 may calculate the angular frequency command value of the rotating coordinate system based on the torque target value and the rotational speed of the electric motor 3. The phase correction unit 214 may correct the angular frequency command value based on the first deviation when the rotational speed of the rotating coordinate system is within the first band and correct the angular frequency command value based on the second deviation when the rotational speed of the rotating coordinate system is within the second band. The phase calculation unit 213 may calculate the phase of the rotating coordinate system by integrating the corrected angular frequency command value. In this case, in both the first correction method and the second correction method, the phase of the slave rotating coordinate system can more reliably follow the phase of the master rotating coordinate system.

The power conversion device 5 may further include the master information acquisition unit 211 configured to obtain the sine value of the phase of the master rotating coordinate system and the cosine value of the phase of the master rotating coordinate system from the power conversion device 4, and the phase correction unit 214 may correct the phase of the rotating coordinate system based on the sine value and the cosine value when the rotational speed of the rotating coordinate system is within the first band.

Since the phase of the master rotating coordinate system repeats gradual increase from 0° to 360° and rapid decrease from 360° to 0°, it is difficult to receive information of the phase of the master rotating coordinate system with accuracy in the vicinity of 360°. On the other hand, the sine value and the cosine value do not abruptly change like the above-stated rapid decrease from 360° to 0°. For this reason, the phase of the master rotating coordinate system is acquired separately for its sine and cosine values from the power conversion device 4, and the phase of the master rotating coordinate system is calculated based on the sine value and the cosine value, whereby the phase information of the master rotating coordinate system can be acquired with reliability.

The power conversion device 5 may further include the abnormality monitoring unit 220 that detects an abnormality of the communication path for acquiring the sine value and the cosine value based on a degree to which the sum of the square of the sine value and the square of the cosine value deviates from one. In this case, the abnormality of the communication path for acquiring the sine value and the cosine value may be detected by using the relationship between the sine value and the cosine value.

The master information acquisition unit 211 may further acquire the phase of the master voltage command in the master rotating coordinate system from the power conversion device 4, and the abnormality monitoring unit 220 may detect the abnormality of the communication path for acquiring the phase of the master voltage command in the master rotating coordinate system when the phase of the master voltage command in the master rotating coordinate system is less than the predetermined level.

As long as the torque is generated in the electric motor 3, the phase of the master voltage command in the master rotating coordinate system does not become zero. Therefore, based on whether or not the phase of the master voltage command in the master rotating coordinate system is smaller than the predetermined level, the abnormality of the communication path for acquiring the phase of the master voltage command in the master rotating coordinate system may be detected.

The power conversion device 5 may further include the torque target value calculation unit 212 that calculates the torque target value based on the master torque target value that is the torque target value in the master device, and the phase calculation unit 213 may calculate the phase of the rotating coordinate system based on the torque target value calculated by the torque target value calculation unit 212 and the rotational speed of the electric motor 3. In this case, by controlling the torque target value close to the master torque target value, the second rotating magnetic field can be synchronized with the first rotating magnetic field with reliability.

The power conversion device 5 may further include the master information acquisition unit 211 that acquires the master torque target value and the abnormality monitoring unit 220 that detects the abnormality of the communication path for acquiring the master torque target value. The abnormality monitoring unit 220 may detect the abnormality of the communication path based on the first deviation that is a difference between the phase of the master rotating coordinate system and the phase of the rotating coordinate system when the rotational speed of the rotating coordinate system is within the first band, and detect the abnormality of the communication path based on the second deviation which is the difference between the phase of the master rotating coordinate system of the master voltage command and the phase of the rotating coordinate system of the voltage command when the rotational speed of the rotating coordinate system is within the second band.

The magnitude of the difference between the phase of the master voltage command in the master rotating coordinate system and the phase of the voltage command in the rotating coordinate system greatly changes depending on whether the torque target value is corrected based on the master torque target value. Therefore, the abnormality of the communication path for acquiring the master torque target value may be detected by detecting the abnormality of the communication path based on the difference between the phase of the master voltage command in the master rotating coordinate system and the phase of the voltage command in the rotating coordinate system.

The primary side power and the secondary side power may be AC power, and the power conversion circuit 10B may be the matrix converter circuit that performs the power conversion from the primary side power to the secondary side power and power conversion from the secondary side power to the primary side power. In the matrix converter circuit, as the rotational speed of the rotating coordinate system decreases, the variation in the instantaneous value of the master voltage phase tends to increase. Even in such a case, the phase of the rotating coordinate system may be corrected based on the phase of the master rotating coordinate system, when the rotational speed of the rotating coordinate system is the first rotational speed that is lower than the second rotational speed.

It is to be understood that not all aspects, advantages and features described herein may necessarily be achieved by, or included in, any one particular example. Indeed, having described and illustrated various examples herein, it should be apparent that other examples may be modified in arrangement and detail.

What is claimed is:

1. A power conversion device comprising:
   power conversion circuitry configured to perform a power conversion for outputting a driving power to an induction motor;
   a communication interface configured to receive one or more signals from a master power conversion device; and
   control circuitry configured to:
      receive a master command phase from the communication interface based, at least in part, on the one or more signals from the master power conversion device;
      generate a voltage command having a command phase in a rotating coordinate system based on a torque target value, wherein a rotating magnetic field for driving a rotor of the induction motor is generated to rotate with the rotating coordinate system;
      calculate a rotation phase of the rotating coordinate system based on a command phase difference between the master command phase and the command phase to reduce the command phase difference; and
      control the power conversion circuitry to output the driving power to the induction motor, based on the rotation phase and the voltage command, so that the rotating magnetic field is in synchronization with a master rotating magnetic field generated by the master power conversion device.

2. The power conversion device according to claim 1, wherein the communication interface is further configured to receive one or more second signals from the master power conversion device, and
   wherein the control circuitry is further configured to:
      receive a master rotation phase from the communication interface based, at least in part, on the one or more second signals from the master power conversion device;
      calculate the rotation phase based on a rotation phase difference between the master rotation phase and the rotation phase to reduce the rotation phase difference if a coordinate rotation speed of the rotating coordinate system is less than a first threshold; and
      calculate the rotation phase based on the command phase difference if the coordinate rotation speed is greater than a second threshold that is equal to or higher than the first threshold.

3. The power conversion device according to claim 2, wherein the control circuitry is further configured to:
   calculate the rotation phase based on a weighted average value of the command phase difference and the rotation phase difference if the coordinate rotation speed is between the first threshold and the second threshold; and gradually decrease a weight of the rotation phase difference and gradually increase a weight of the command phase difference as the coordinate rotation speed approaches the second threshold from the first threshold.

4. The power conversion device according to claim 2, wherein the control circuitry is further configured to:

calculate the rotation phase based on a torque target value, a rotor speed of the induction motor, and the rotation phase difference if the coordinate rotation speed is less than the first threshold; and calculate the rotation phase based on the torque target value, the rotor speed, and the command phase difference if the coordinate rotation speed is greater than the second threshold.

5. The power conversion device according to claim 4, wherein the control circuitry is further configured to:

calculate an angular frequency command value of the rotating coordinate system based on the torque target value and the rotor speed;

correct the angular frequency command value based on the rotation phase difference if the coordinate rotation speed is less than the first threshold;

correct the angular frequency command value based on the command phase difference if the coordinate rotation speed is greater than the second threshold; and calculate the rotation phase by integrating the corrected angular frequency command value.

6. The power conversion device according to claim 2, wherein the one or more second signals received from the master power conversion device comprise a sine value of the master rotation phase and a cosine value of the master rotation phase, and wherein the control circuitry is further configured to calculate the rotation phase based on the sine value and the cosine value if the coordinate rotation speed is less than the first threshold.

7. The power conversion device according to claim 6, wherein the control circuitry is further configured to detect an abnormality of a communication for receiving the sine value and the cosine value based on a square sum of the sine value and the cosine value.

8. The power conversion device according to claim 7, wherein the control circuitry is further configured to detect an abnormality of a second communication for receiving the master command phase if the master command phase is smaller than a predetermined level.

9. The power conversion device according to claim 2, wherein the communication interface is further configured to receive one or more third signals from the master power conversion device, and wherein the control circuitry is further configured to:

receive a master torque target value from the communication interface based, at least in part, on the one or more third signals from the master power conversion device;

calculate the torque target value based on the master torque target value; and generate the voltage command based on the calculated torque target value.

10. The power conversion device according to claim 7, wherein the control circuitry is further configured to:

detect an abnormality of the communication interface a based on the rotation phase difference if the coordinate rotation speed is less than the first threshold; and detect the abnormality of the communication based on the command phase difference if the coordinate rotation speed is greater than the second threshold.

11. The power conversion device according to claim 1, wherein the power conversion circuitry is a matrix converter circuitry configured to perform bidirectional AC-AC power conversion.

12. The power conversion device according to claim 1, wherein the control circuitry is further configured to calculate the rotation phase based on the torque target value, a rotor speed of the induction motor, and the command phase difference.

13. The power conversion device according to claim 12, wherein the control circuitry is further configured to:

calculate an angular frequency command value of the rotating coordinate system based on the torque target value and the rotor speed of the induction motor;

correct the angular frequency command value based on the command phase difference to reduce the command phase difference; and calculate the rotation phase by integrating the corrected angular frequency command value.

14. A power conversion device according to claim 1, wherein the power conversion device is configured to operate as the master power conversion device in a first mode, or as a second power conversion device in a second mode, based on a mode selection input, wherein the control circuitry, in the first mode, is configured to:

generate a master voltage command having the master command phase in a master rotating coordinate system that rotates with the rotor; and control the power conversion circuitry to output a master driving power to the induction motor based on the master voltage command, and wherein the control circuitry, in the second mode, is configured to:

generate the voltage command based on the torque target value;

calculate the rotation phase based on the command phase difference to reduce the command phase difference; and control the power conversion circuitry to output the driving power to the induction motor based on the rotation phase and the voltage command.

15. A control system comprising:

the power conversion device according to claim 1; and the master power conversion device, wherein the master power conversion device comprises:

a master communication interface communicatively coupled with the communication interface of the power conversion device;

master power conversion circuitry configured to perform a master power conversion for outputting a master driving power to the induction motor; and master control circuitry configured to:

generate a master voltage command having the master command phase in a master rotating coordinate system that rotates with the rotor;

control the master power conversion circuitry to output the master driving power to the induction motor, based on the master voltage command; and cause the master communication interface to transmit the one or more signals to the communication interface of the power conversion device based, at least in part, on the master command phase of the master voltage command.

16. A drive system comprising:
the control system according to claim 15; and
the induction motor,
wherein the induction motor includes a first group of primary coils and a second group of primary coils,
wherein the master power conversion circuitry is configured to output the master driving power to the first group of primary coils, and
wherein the power conversion circuitry is configured to output the driving power to the second group of primary coils.

17. A power conversion method comprising:
generating a first voltage command having a first command phase in a first rotating coordinate system based on a first torque target value, wherein a first rotating magnetic field for driving a rotor of an induction motor is generated to rotate with the first rotating coordinate system;
calculating a first rotation phase of the first rotating coordinate system based on a first torque target value and a rotor speed of an induction motor;
outputting a first driving power to the induction motor based on the first rotation phase and the first voltage command;
generating a second voltage command having a command phase in a second rotating coordinate system based on a second torque target value, wherein a second rotating magnetic field for driving the rotor of the induction motor is generated to rotate with the second rotating coordinate system;
calculating a second rotation phase of the second rotating coordinate system based on a command phase difference between the first command phase and the command phase to reduce the command phase difference; and
outputting a second driving power to the induction motor, based on the second rotation phase and the second voltage command, so that the second rotating magnetic field is in synchronization with the first rotating magnetic field.

18. The power conversion method according to claim 17, further comprising calculating the second rotation phase based on a rotation phase difference between the first rotation phase and the second rotation phase to reduce the rotation phase difference if a coordinate rotation speed of the second rotating coordinate system is less than a first threshold, wherein the second rotation phase is calculated based on the command phase difference if the coordinate rotation speed is greater than a second threshold that is equal to or greater than the first threshold.

19. A non-transitory memory device having instructions stored thereon that, in response to execution by a power conversion device, cause the power conversion device to perform operations comprising:
receiving one or more signals from a master power conversion device;
determining a master command phase from the one or more signals, wherein the master command phase indicates a phase of a master voltage command in a master rotating coordinating system of the master power conversion device;
generating a voltage command having a command phase in a rotating coordinate system of the power conversion device based on a torque target value, wherein a rotating magnetic field for driving a rotor of an induction motor is generated to rotate with the rotating coordinate system;
calculating a rotation phase of the rotating coordinate system based on a command phase difference between the master command phase and the command phase to reduce the command phase difference; and
controlling a power conversion circuitry to output a driving power to the induction motor, based on the rotation phase and the voltage command, so that the rotating magnetic field is in synchronization with a master rotating magnetic field generated by the master power conversion device.

20. The non-transitory memory device according to claim 19, wherein the operations further comprise:
receiving one or more second signals from the master power conversion device;
determining a master rotation phase from the one or more second signals, wherein the master rotation phase indicates another phase in the master rotating coordinate system of the master power conversion device; and
calculating the rotation phase based on a rotation phase difference between the master rotation phase and the rotation phase of the power conversion device to reduce the rotation phase difference if a coordinate rotation speed of the rotating coordinate system is less than a first threshold, and
wherein the rotation phase is calculated based on the command phase difference if the coordinate rotation speed is greater than a second threshold that is equal to or greater than the first threshold.

* * * * *